(12) United States Patent
Arcadinho et al.

(10) Patent No.: US 11,726,750 B1
(45) Date of Patent: Aug. 15, 2023

(54) CONSTRAINED DECODING AND RANKING OF LANGUAGE MODELS FOR CODE GENERATION

(71) Applicant: OutSystems—Software em Rede, S.A., Linda-A-Velha (PT)

(72) Inventors: Samuel David Pelaio Arcadinho, Lisbon (PT); João Pedro Gonçalves Lages, Lisbon (PT); João Pedro Nunes Nadkarni, Lisbon (PT); Mariana Rodrigues Lourenço, Coimbra (PT); Ana Sofia Aparicio da Costa, Lisbon (PT); David Oliveira Aparício, Vila Nova de Gaia (PT); António Manuel de Carvalho dos Santos Alegria, Lisbon (PT); Paulo Jorge Abreu Duarte Ferreira, Amadora (PT); Catarina Pina de Almeida Coelho, Lisbon (PT); Ângelo Filipe da Silva dos Santos, Lisbon (PT); Hugo Miguel Ferrão Casal da Veiga, Sintra (PT); Magda Almeida Lopes Pereira, Amadora (PT)

(73) Assignee: OutSystems—Software em Rede, S.A.

(*) Notice: Subject to any disclaimer, the term of this patent is extended or adjusted under 35 U.S.C. 154(b) by 0 days.

(21) Appl. No.: 17/987,718

(22) Filed: Nov. 15, 2022

Related U.S. Application Data

(60) Provisional application No. 63/388,463, filed on Jul. 12, 2022, provisional application No. 63/280,314, filed on Nov. 17, 2021.

(51) Int. Cl.
*G06F 8/33* (2018.01)
*G06F 40/40* (2020.01)
*G06F 40/284* (2020.01)

(52) U.S. Cl.
CPC ............ *G06F 8/33* (2013.01); *G06F 40/284* (2020.01); *G06F 40/40* (2020.01)

(58) Field of Classification Search
None
See application file for complete search history.

(56) References Cited

U.S. PATENT DOCUMENTS

| 2007/0106495 A1* | 5/2007 | Ramsey | G06F 40/35 704/9 |
| 2007/0106497 A1* | 5/2007 | Ramsey | G06F 40/295 704/9 |

(Continued)

FOREIGN PATENT DOCUMENTS

| CN | 112069199 A  * | 12/2020 | G06F 16/243 |
| CN | 112487135 B  * | 7/2022 | G06F 16/313 |
| DE | 202017105835 U1 * | 2/2018 | G06F 40/40 |

OTHER PUBLICATIONS

Chen et al., Evaluating Large Language Models Trained on Code, Machine Learning, arXiv:2107.03374 [cs.LG], Jul. 14, 2021, 35 pages.

(Continued)

*Primary Examiner* — Isaac Tuku Tecklu
(74) *Attorney, Agent, or Firm* — Van Pelt, Yi & James LLP

(57) ABSTRACT

In various embodiments, a process for constrained decoding and ranking of language models for code generation includes receiving a natural language input specifying a desired computer task. The process includes using a machine learning trained converter to convert the natural language input to an output in a computer language, including by, based on a specified grammar for the computer language, limiting eligible options for a token to include in the output (Continued)

in the computer language. The process includes providing the output in the computer language for computer execution.

20 Claims, 20 Drawing Sheets

(56) References Cited

U.S. PATENT DOCUMENTS

| | | | | |
|---|---|---|---|---|
| 2015/0032443 | A1* | 1/2015 | Karov | G06F 40/30 |
| | | | | 704/9 |
| 2018/0329993 | A1* | 11/2018 | Bedadala | G06F 16/90332 |
| 2018/0336198 | A1* | 11/2018 | Zhong | G06N 3/006 |
| 2021/0342552 | A1* | 11/2021 | Mishra | G06N 3/044 |
| 2021/0357187 | A1* | 11/2021 | Clement | G06F 8/35 |
| 2021/0357210 | A1* | 11/2021 | Clement | G06N 3/045 |
| 2021/0357409 | A1* | 11/2021 | Rodriguez | G06F 40/157 |

OTHER PUBLICATIONS

Feng et al., CodeBERT: A Pre-Trained Model for Programming and Natural Languages, Computation and Language, arXiv:2002.08155v4 [cs.CL], Sep. 18, 2020, 12 pages.

Gan et al., Natural SQL: Making SQL Easier to Infer from Natural Language Specifications, Computation and Language, arXiv:2109.05153v1 [cs.CL], Sep. 11, 2021, 13 pages.

Huang et al., Relation Aware Semi-autoregressive Semantic Parsing for NL2SQL, Computation and Language, arXiv:2108.00804 [cs.CL], Aug. 2, 2021, 8 pages.

Liang et al., GP: Context-free Grammar Pre-training for Text-to-SQL Parsers, Computation and Language, arXiv:2101.09901 [cs.CL], Apr. 16, 2021, pp. 1-11.

Lin et al., Bridging Textual and Tabular Data for Cross-Domain Text-to-SQL Semantic Parsing, Computation and Language, arXiv:2012.12627 [cs.CL], Dec. 31, 2020, 23 pages.

Poesia et al., Synchromesh: Reliable Code Generation From Pre-Trained Language Models, Machine Learning, arXiv:2201.11227 [cs.LG], Jan. 26, 2022, pp. 1-19.

Power Apps, Power Apps Ideas (preview), Retrieved from https://learn.microsoft.com/en-us/power-apps/maker/canvas-apps/power-apps-ideas on Dec. 22, 2022, pp. 1-2.

Scholak et al., PICARD: Parsing Incrementally for Constrained Auto-Regressive Decoding from Language Models, Computation and Language, arXiv:2109.05093 [cs.CL], Sep. 10, 2021, 7 pages.

Svyatkovskiy et al., IntelliCode Compose: Code Generation using Transformer, Proceedings of the 28th ACM Joinl European Software Engineering Conference and Symposium on the Foundations of Software Engineering (ESEC/FSE 20), Nov. 8-13, 2020, 11 pages.

Wikipedia, GPT-3, Generative Pre-trained Transformer 3, Retrieved from https://en.wikipedia.Org/w/index.php?title=GPT-3&oldid=1121126723 on Dec. 19, 2022, pp. 1-10.

* cited by examiner

AI Assistant

Ask the AI Assistant for your data just like you would ask a person.

You ask: Which employees live in London

We deliver: Everything about your London-based employees.

You ask: Group all orders for Berlin by date

We deliver: Everything about your orders shipping to Berlin - neatly grouped by their shipping date.

Use the suggestions from the dropdown to speed up your query.

Group all ord

You type

We suggest

Entity
Orders
OrderSuppliers
Attribute
Orders.OrderId
Orders.OrderLocation Panel 800

| | | |
|---|---|---|
| Almond Olive Oil Christmas Cake With Brandy Syrup | 25.09 | Donna Hay |
| Crispy Duck With Red Endive And Spinach | 36.63 | Gordan Ramsay |
| An Evolution of Pesto | 35.00 | Massimo Bottura |
| Foie Gras Ravioli With Tartufi Di Alba | 18.86 | Alain Ducasse |
| Butter-Poached Lobster With Macaroni And Cheese | 27.14 | Thomas Keller |

Active | Debugger | 1-Click Publish | Q 'Keyword' occurrences in Module

- Chef
- DirectoryMobile SampleData
- OutSystemsUI
- LocalStorage
- Structures
- Client Variables
- Site Properties
- Resources FIG. 13B (Continued)

_US 11,726,750 B1_

CONSTRAINED DECODING AND RANKING OF LANGUAGE MODELS FOR CODE GENERATION

CROSS REFERENCE TO OTHER APPLICATIONS

This application claims priority to U.S. Provisional Patent Application No. 63/280,314 entitled USING NATURAL LANGUAGE TO AGGREGATE DATA filed Nov. 17, 2021, and U.S. Provisional Patent Application No. 63/388,463 entitled CONSTRAINED DECODING AND RANKING OF LANGUAGE MODELS FOR CODE GENERATION filed Jul. 12, 2022, both of which are incorporated herein by reference for all purposes.

BACKGROUND OF THE INVENTION

Machine-assisted software development is an emerging field, and aims to enable developers to create executable computer programs without requiring coding language fluency or a high degree of domain knowledge. For example, developers can interact with a "low-code" or "no-code" software development tool embodied in a visual modeling environment to develop executable computer programs such as enterprise or consumer Web and mobile applications. Developers can design computer programs by interacting with a graphical user interface to model (e.g., visually model) program functionality instead of manually writing code. Sometimes developers may be able to formulate desired program behavior in natural language but lack the skillset to express this in a computer language. Thus, there is a need to assist developers in this regard.

BRIEF DESCRIPTION OF THE DRAWINGS

Various embodiments of the invention are disclosed in the following detailed description and the accompanying drawings.

FIG. 8 illustrates an example of a graphical user interface for displaying information and instructions for entering a natural language statement obtained in some embodiments.

FIG. 9 illustrates an example of a graphical user interface including a pop-up for displaying information and instructions for entering a natural language statement obtained in some embodiments.

DETAILED DESCRIPTION

Figure 1:
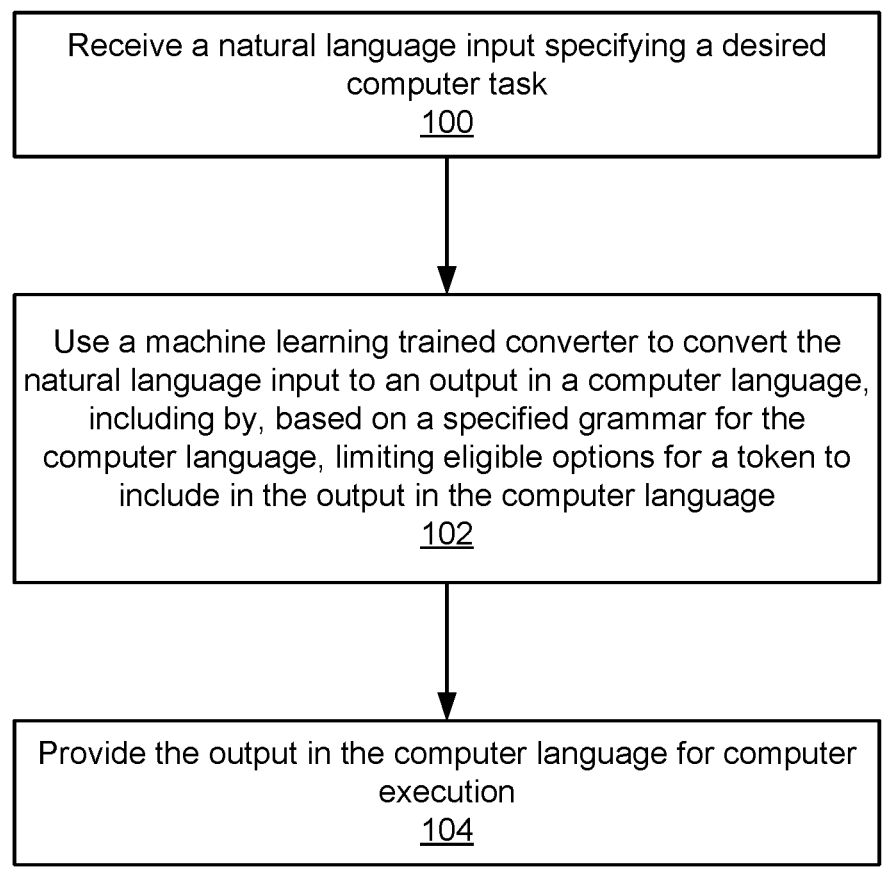
FIG. 1 is a flow diagram illustrating an embodiment of a process for providing constrained decoding and ranking of language models outputs for code generation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating code from natural language can be performed using artificial intelligence. Sequence-to-sequence transformer models have been used for the task. They typically rely on general language models that then are fine-tuned for the specific task such as outputting sequences of code from sequences of natural language text. State-of-the-art techniques for generating code such as PICARD and Synchromesh do not always perform well. For example, PICARD operates by fully pruning branches of a search tree during beam search, i.e., PICARD discards code generations that are not valid code in terms of syntax. If none of the beams are valid, then PICARD will not generate a valid SQL statement. Therefore, conventional techniques are not always able to generate valid code. They are also typically computationally expensive. For example, they may require very large machine learning models, such as large language models, to achieve good performance.

Techniques for providing constrained decoding of language models and ranking of language model predictions for code generation are disclosed. Given a natural language input, the disclosed techniques may be applied to generate valid code in an efficient manner. As used herein, "valid code" refers to a computer language expression that is executable. For example, for computer languages that manage data held in a database, valid code is executable code that refers to only data contained in the data model. Valid code conforms to the rules of a computer language so that statements are correctly structured and have correct syntax.

In various embodiments, a process for code generation includes receiving a natural language input specifying a desired computer task. The natural language input may be formed by a user via a graphical user interface of a platform such as a low-code or no-code platform. Auto-suggestions or auto-completions may be provided in real-time while the user is forming the natural language input. The code generation process uses a machine learning trained converter to transform the natural language input to an output in a computer language, including by, based on a specified grammar for the computer language, limiting eligible options for a token to include in the output in the computer language. For example, the output is initially an empty string, and tokens are iteratively selected to be included (e.g., concatenated) until a complete and valid computer language statement corresponding to the natural language input is formed. The process provides the output in the computer language for computer execution.

Advantages of the disclosed techniques include being able to always generate valid code and achieving good performance in an efficient way. For example, good performance can be achieved using smaller language models compared with state-of-the-art techniques. In various embodiments, code generated by a transformer model (e.g., T5) is constrained to generate only those candidate computer language statements that are valid and probable. The generator may include a language model trained on labeled data to convert natural language to computer language. In various embodiments, to complement the generator, the machine learning trained converter additionally includes a ranker model. Candidate computer language statements generated by the generation model are ranked (and/or re-ranked) to maximize the accuracy of the constrained code generation by using a separately trained model (called a "ranker") to re-rank the suggestions. In other words, the generation model generates a first ranking of candidates and the ranker model re-ranks the candidates generated by the generation model. By using the ranker model, larger generation models may not be needed since the performance benefits that larger generation models can be realized by the ranker. In various embodiments, the accuracy of code-generation models is measured. The measurements more accurately indicate real-world usefulness of the generated code (compared with conventional evaluation metrics). For example, an adapted tree-based edit distance (TED) is calculated and indicates how well the machine learning trained converter performs. Embodiments of the present disclosure yield higher accuracy and allow for using smaller machine learning language models, which are faster and cheaper to train. In one aspect, natural language can be transformed to computer language using fewer computational resources. In another aspect, this allows those with limited access to computational resources such as expensive graphical processing units to be able to transform natural language to computer language.

In various embodiments, a graphical user interface (GUI) guides a user to write better natural language inputs. The GUI may help validate whether the intended natural language input is correct, as well as give feedback to help improve the natural language input. A better natural language input increases the probability that the machine learning trained converter transforms natural language input to computer language code that reflects the desired computer task to be performed. For example, auto-complete helps a user write column and table names that actually exist in the database. The user need not remember or know the exact column and table names and can instead select the one suggested by auto-complete, as further described herein.

The examples described herein refer to SQL statements. However, this is not intended to be limiting as the disclosed techniques may be applied to transform natural language expressions to any computer language (sometimes called "programming language"). Each programming language may have its specific challenges or characteristics. For example, generating SQL from natural language is challenging since the natural language might be ambiguous (e.g., columns with the same name, use of synonyms) and obtaining pairs of natural language queries to SQL may be difficult since the labelling task is typically time-consuming.

Figure 2:
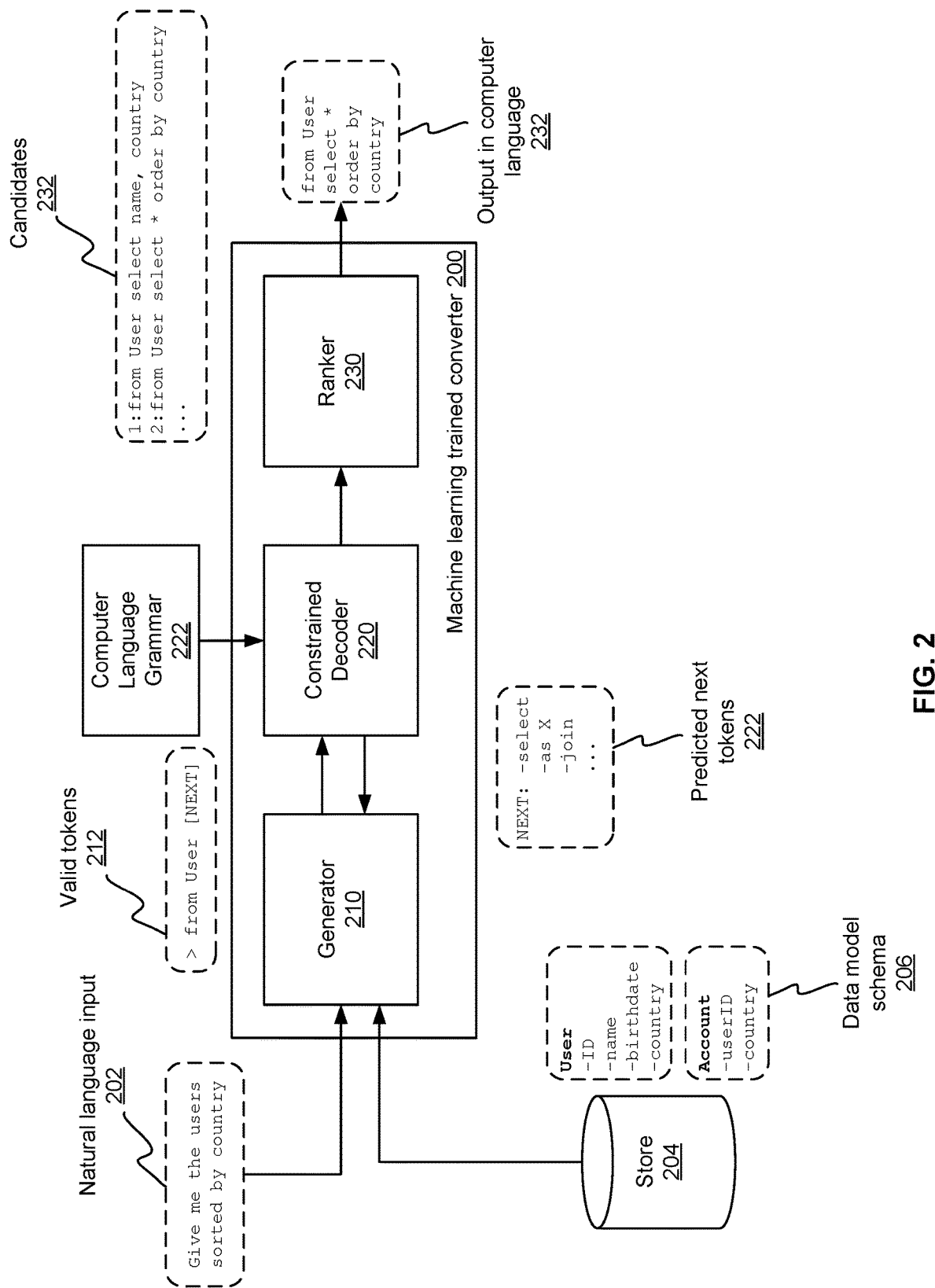
FIG. 2 is a block diagram illustrating an embodiment of a system for providing constrained decoded generations by language models and subsequent re-ranking of those code generations.
Figure 3:
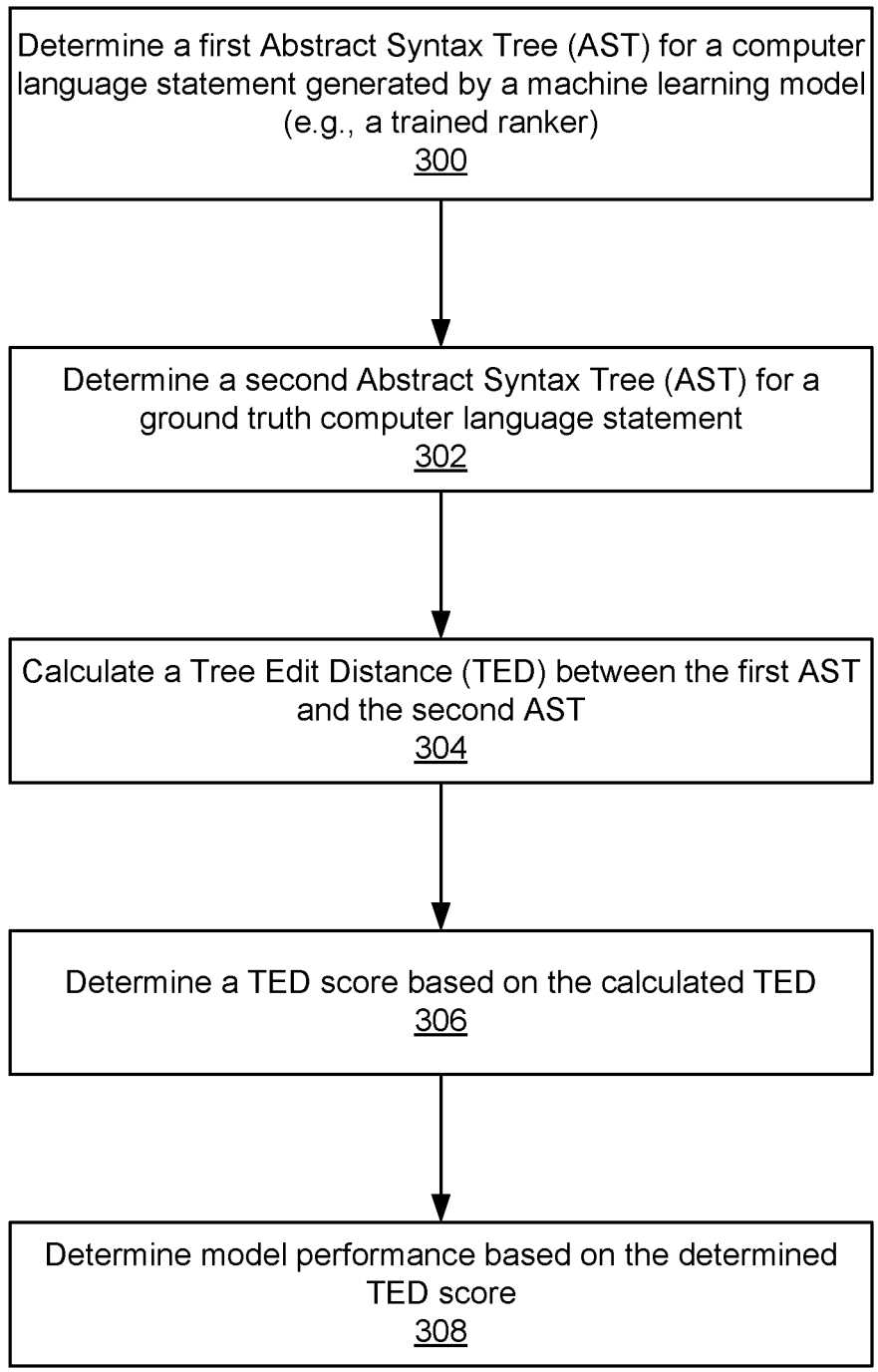
FIG. 3 is a flow diagram illustrating an embodiment of a process for determining a tree edit distance.
Figure 4:
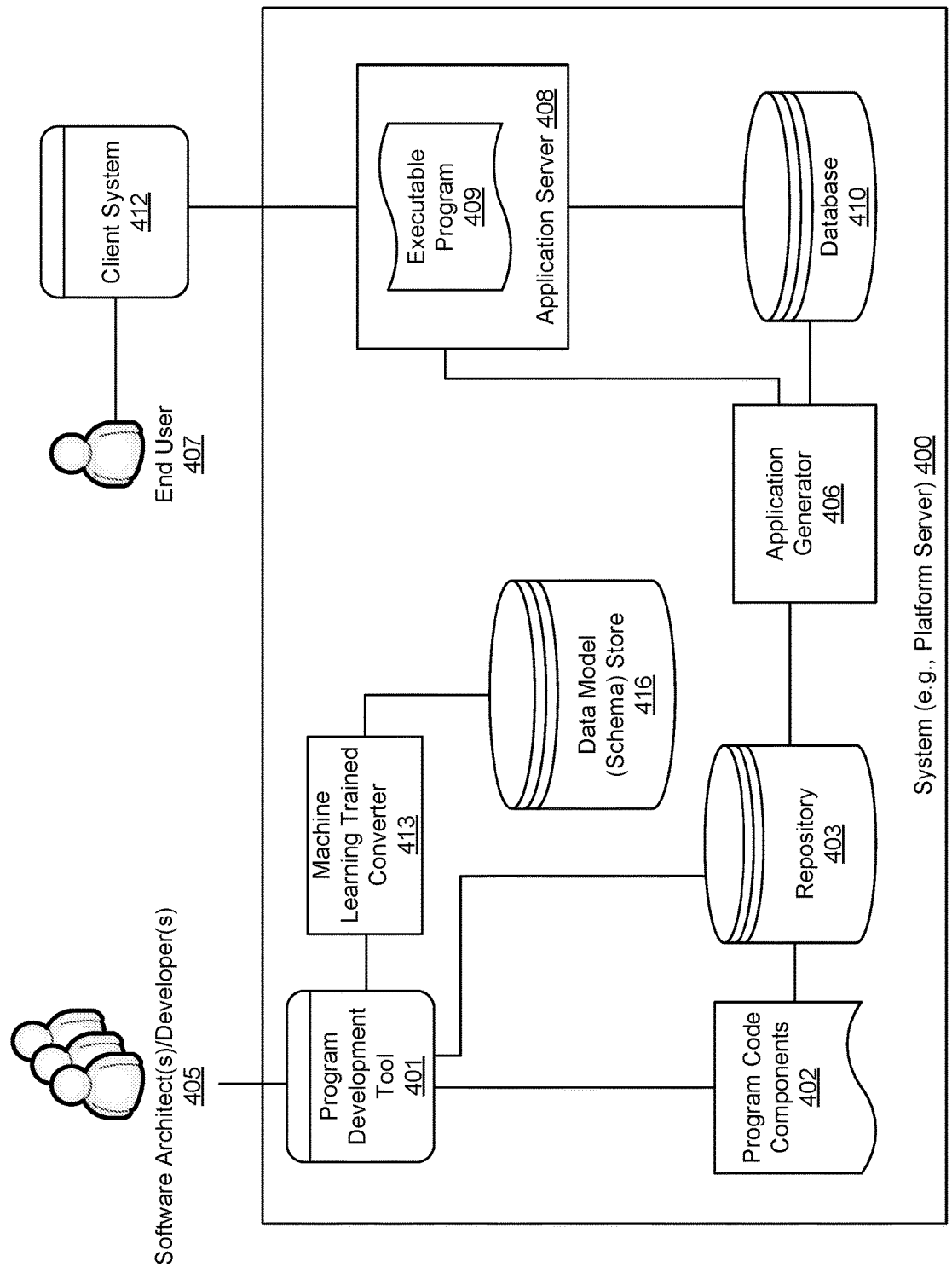
FIG. 4 is a block diagram illustrating an embodiment of a system for providing constrained decoding and ranking of language models for code generation.

First, constrained decoding and ranking of language models is described (FIGS. 1-3). Next, a low-code platform in which the disclosed techniques may be applied is described (FIG. 4). Finally, some example GUIs for receiving natural language input and outputting results are described (FIGS. 5-13B).

FIG. 1 is a flow diagram illustrating an embodiment of a process for providing constrained decoding and ranking of language models outputs for code generation. This process may be implemented on one or more machine learning models such as the machine learning trained converter 200 further described with respect to FIG. 2.

Conventionally, a user can use a (low-code) platform to create queries either by writing a computer language expression (e.g., structured query language or SQL) or by configuring an aggregate. An aggregate is a model version of the computer language expression. However, some users may not have expertise in computer languages or configuring an aggregate. The disclosed techniques may be applied to transform natural language inputs to computer language for computer execution. For example, a natural language input is converted to computer code, and the computer code is converted into the model version of a query.

In the example shown, the process begins by receiving a natural language input specifying a desired computer task (100). A natural language input may be a statement, expression, prompt, or the like. A desired computer task may be any task that can be performed by a computer. For example, the natural language input may be "Get all users ordered by name," which specifies a computer task to retrieve the corresponding data. As another example, the input may be "Change the country of User with Id=75 to 'England'," which specifies a computer task to update data. As yet another example, the input may be "Delete 'Hamlet' from Books," which specifies a computer task to delete data.

The natural language input may be created by a user (e.g., a design model developer 405 further described with respect to FIG. 4) via a development platform (e.g., system 400 further described with respect to FIG. 4). The user can form any type of query that results in an action such as data retrieval, data update, or data deletion. The quality of the natural language input may affect the likelihood of transforming the input to a desired computer language output, so feedback/suggestions may be provided in real-time while the natural language input is being formulated. As further described herein, the platform may provide instructions, suggestions, autocompletions, or the like via a user interface, which the user may accept or ignore.

The process uses a machine learning trained converter to transform the natural language input to an output in a computer language (102). The process transforms the natural language input to the output, including by, based on a specified grammar for the computer language, limiting eligible options for a token to include in the output in the computer language.

The process transforms the natural language input to the computer language output subject to (e.g., constrained by) a data model schema. For example, if the computer language output manages data held in a database, the process receives the data model schema along with the input natural language and selects only the relevant components of the data model, e.g., the columns and tables that are mentioned in the natural language query. A "data model" as used herein refers to contents of a database such as a list of tables and their respective columns. A "data model schema" as used herein refers to a structure of the data model and does not necessarily include the contents/values of the table. The process determines and outputs a computer language statement (e.g., a SQL query) that corresponds to the received natural language input. In various embodiments, the transformation is performed by a converter that includes one or more trained machine learning models, such as a generator 210 and a ranker 230. As further described herein with respect to FIG. 2, the machine learning model(s) may be trained to generate a computer language statement that corresponds to a natural language input.

In various embodiments, the process uses constrained decoding to transform the natural language input to the computer language output. Constrained decoding refers to limiting which tokens the process considers when predicting the next token. For example, the process limits eligible options for a token to include in the output in the computer language. As used herein, a "token" refers to an atomic parse element such as a word. An output in the computer language includes a sequence of one or more tokens. Whether a token is eligible for inclusion in the computer language output may be based on a specified grammar for the computer language. The grammar defines structural constraints of a statement/expression and may include one or more rules. For example, a rule may define permitted tokens that follow a given token. In other words, a specified grammar is defined and used to enforce valid tokens. Constrained decoding also limits the token generation of tables/columns to those that actually exist in the data model schema, which also ensures that valid (executable) code will be generated. For the example of SQL, the specified grammar may be a context-free grammar (CFG) of SQL statements. The specified grammar may be pre-defined, e.g., by a user or system.

To form the computer language output, the process starts with an empty string and iteratively predicts the next token. Unlike conventional techniques, the next token prediction is limited to only tokens that form a valid computer language statement up to that point. For example, if the current computer language statement is a SQL query beginning with "select Username," the next valid tokens include "from," "as X," and "Country," but do not include "select" or "delete *". The generation of computer language statements may be performed using beam search, thus producing a set of candidate statements (all of which are valid computer code). The candidate statements may be re-ranked as further described herein to select a final prediction. In various embodiments, the output in the computer language is selected based on a score corresponding to a combination of a score determined by a generator with a score determined by a ranker, as further described herein. The selection can be made such that the output is: a single computer language output, a predefined number of computer language outputs (e.g., the top-n), or all of the computer language outputs.

The process provides the output in the computer language for computer execution (104). The output includes valid computer code that can be executed to perform the desired computer task. The output can be provided to an execution engine without notifying the user and/or the output can be provided to the user so the user can see how the natural language was transformed into a computer language statement. For example, an output in SQL code can be used to directly query a database to manipulate data as specified by the SQL code or provided to the user who will decide to run the query or not.

The process will now be described using the example of system 200 shown in the following figure.

FIG. 2 is a block diagram illustrating an embodiment of a system for providing constrained decoded generations by language models and subsequent re-ranking of those code generations. The system 200 is sometimes referred to as a machine learning trained converter because the system transforms a natural language input 202 into an output in computer language 232. In this example, the system includes a generator 210, constrained decoder 220, and a ranker 230. As further described herein, the system may include one or more trained machine learning models. For example, the generator 210 and the ranker 230 may each be implemented by a machine learning model. Although these three components are depicted as independent modules, the functionalities may be embodied in a single machine learning model or split across multiple machine learning models.

The generator 210 is configured to generate one or more candidate outputs in computer language based on a natural language input. In various embodiments, the generator includes a machine learning model (such as T5) that generates computer language statements (e.g., SQL) from a natural language input. The generator cooperates with the constrained decoder 220 to form valid computer code. For example, the constrained decoder informs the generator of a token that can be considered as an option (e.g., is valid). In other words, the generator consults with the constrained decoder to predict the next token.

The constrained decoder 220 is configured to determine valid tokens based on one or more tokens that have been generated by the generator. The constrained decoder limits eligible options for a token to include in the output in the computer language based on a specified grammar for the computer language. As described with respect to FIG. 1, if the current computer language statement is a SQL query beginning with "select Username," the next valid tokens include "from," "as X," and "Country". Invalid tokens are "select" or "delete *" because these tokens would result in invalid computer code.

The computer language grammar 222 can be pre-defined, for example by a user (e.g., 405 of FIG. 4). The following is an example of a specified grammar for high-level SQL predicates. Statements inside square brackets indicate that they are optional (e.g., a SQL query might have an empty where statement).

⟨ sql⟩ |=⟨ expr⟩
⟨ expr⟩ |=⟨ query⟩ |⟨ expr⟩ union⟨ expr⟩ |⟨ expr⟩ intersect
    ⟨ expr⟩ |⟨ expr⟩ except⟨ expr⟩
⟨ query⟩ |=from⟨ from-expr⟩ select⟨ select-expr⟩ [where
    ⟨ where-expr⟩ ][group by ⟨ groupby-expr⟩ ][having⟨ having-expr⟩ ][order by⟨ orderby-expr⟩ ][limit⟨ limit-expr⟩ ]

In this example grammar, only SQL data retrieval (i.e., "select") statements are supported. It may be desirable to define a grammar in this way because the focus is on queries where the user wants to retrieve data from a database. "Select" statements can be a single query or contain subqueries joined by unions, intersects, and excepts.

Unlike conventional SQL, here, the "from" and the "select" statements are inverted ("from" precedes "select") because this helps the generator 210 to generate SQL with valid table names (tables that exist in the data model) and valid column names (columns that exist in the data model for the given table). In other words, the tokens corresponding to the "from" predicate appear first in the code generation, and only after the "from" predicate do the tokens corresponding to the "select" predicate appear in the code generation". To constrain the generation to valid columns (and not other columns), it is helpful to first know what tables are valid, e.g., which tables appear in the query, and this information is obtained in the "from" statement. Parsing the "from" statement prior to parsing the "select" statement causes the generator to store the selected tables. Consequently, when the "select" statement is parsed, the generator knows what columns are valid because only those columns that appear in the selected tables are valid. If the current query is "from User select," then referring to data model schema 206, "user.id," "user.name," "user.birthdate," and "user.country" are valid token predictions while other tokens such as "user.userId" and "account.userId" are invalid, and thus not generated by the generator since the constrained decoder does not include them in the list of valid tokens.

For a given query and data model schema pair, the grammar shown previously can be augmented with one or more additional rules. For example, two additional rules specifying the valid tables and the valid columns can be added. The following production rules may be added:
⟨ table-name⟩ |=user|account
⟨ column-name⟩ |=user.id|user.name|user.birthdate|
    user.name|user.country|account.userId|account.country When a table has an alias, one expression can be added for the alias and another expression can be added for the original table. Suppose alias1 corresponds to tableX. Then, for a column "alias1.columnA", two expressions are added to the ⟨ column-name⟩ rule: "alias1.columnA" and "tableX.columnA."

In various embodiments, the grammar is provided as input to a parser such as Lark. This is merely exemplary and not intended to be limiting as other parsers may be used. Lark may be attractive because it is one of the fastest parsers (for Python) and includes a look-ahead feature.

Store 204 stores data model schema 206. The data model schema describes a structure of the data model, and an appropriate data model schema can be obtained for a particular natural language input. For example, the data model schema corresponding to an input may be looked up via a lookup table.

Although depicted as external to system 200, the store 204 and/or computer language grammar 222 can be local. For example, the data model schema 206 and grammar 222 can be available locally (e.g., previously downloaded).

In various embodiments, beam search is performed to generate a set of k candidate computer language outputs (e.g., queries). Each of the candidate computer language outputs has been formulated by the generator 210 in cooperation with the constrained decoder 220. Beam search generates k outputs, all of which are valid. A ranker 230 (a machine learning trained ranker) is used to re-rank the k candidates and output all (or a subset of them) sorted by score.

The ranker 230 is configured to re-rank the statements generated by the generator 210. In various embodiments, the ranker selects the computer language statement that is closest to the desired computer task as specified by the natural language input (this statement is sometimes called the "best candidate"). For example, a pre-defined number (e.g., 16) of computer language statements (e.g., SQL queries) is sampled for each input (natural language query and data model schema pair) in the training dataset using beam search. From the 16 generated computer language queries, a subset (e.g., 12) are sampled with lowest TED to guarantee that hard negative examples are selected. Hard examples refer to those that are closer to the correct answer (e.g., the correct SQL statement). If the generator model does not predict the correct computer language statement in any of the 12 samples, the one with highest TED is discarded and the correct computer language statement is added as one of the samples. Using the same sampling strategy (e.g., based on TED), an additional two computer language statements are sampled from the training dataset pertaining to the same database as the input, for a total of 14 computer language statements for each natural language input.

In various embodiments, the ranker model 230 is based on CodeBERT in a cross encoder setting. The ranker model is given pairs of statements/queries (natural language, computer language) and predicts the probability of the pairs being correct, meaning the computer language corresponds to the natural language. For the example of SQL generation, the terminals found in the natural language are appended to the final natural language since it was observed empirically that this improves the language model predictions. For example, for the natural language query, "People from 'France'," the natural language is transformed to "People from 'France'|France".

One advantage of having separate models (one model 210 to generate the candidate computer language statements and another model 230 to select the best candidate) is improved performance. In other words, splitting the task of computer language generation into two tasks of (1) candidate generation and (2) candidate ranking, can improve the performance of the complete task since each model is focused on a simpler task.

Using the ranker 230 (along with the generator 210) to determine the computer language output may lead to better results than using the generator alone because the ranker may be better at selecting from a set of limited candidates. In various embodiments, a computer language output is selected based at least on a score determined by the machine learning trained ranker and the generator score for that candidate. To produce the final prediction score for a given candidate generation, the machine learning trained converter 200 combines a probability score determined by the generator 210 with a probability score determined by the ranker 230. For example, the scores can be combined using the linear combination shown in Equation 1, where t is the length of the SQL and λ is a tunable weight. The generator's probability p(y|x) can be compared with the ranker's probability, p(x, y) by scaling the generator's probability by t.

$$\frac{1}{t}\log p(y|x) + \lambda \log p(x, y) \quad (1)$$

In operation, the system receives as input a natural language input 202 (e.g., a query) and a data model schema 204. For purposes of illustration, this figure shows an example natural language input 202 "Give me the users sorted by country," and its corresponding output in computer language 232 "from User select*order by country." The computer language output may be obtained as follows. The generator model obtains a data model schema 206 from store 204. The generator model 210 consults the constrained decoder 220 to determine which tokens are valid 212 and predicts the next token 222. The constrained decoder determines that valid tokens 212 include "from" and "User." Based on these valid tokens, the generator model determines that the next tokens 222 can be one of the following: "select," "as X," "join," etc. In various embodiments, the determination of valid tokens and prediction of next token is performed iteratively until the entire natural language input has been processed or some other stopping condition (e.g., elapsed time) is satisfied. In various embodiments, the generation by the generator model is performed using beam search, thus producing a set of k candidates which are given as input to the ranker model 230. Combinations of tokens are formed. Each combination of token is a candidate 232. In this example, the candidates include "from User select name, country," "from User select*order by country," etc. The ranker re-ranks the candidates and selects the best candidate (or simply orders the list of all, or some, of the generated candidates) to be the output 232. Here, the output is "from User select*order by country." The output 232 is a valid computer language statement that corresponds to the input natural language 202.

Various metrics can be used to evaluate the performance of the machine learning trained converter 200. By way of non-limiting example, two of the most commonly used evaluation metrics for SQL comparison are exact match and execution match. Exact match checks if two SQL statements are syntactically equivalent, while execution match checks if running two SQL statements yields the same output. Since exact match is binary, its value might not be very informative for the user nor the model. Partial matches sub-divide the comparison to only portions of the SQL statement, such as the from clause or the where clause. Thus, one SQL prediction might be wrong in multiple parts of the query, and this more granular information can be useful to improve the model. However, even partial matches might not be granular enough. For example, the following pairs of statements both have a partial match of ⅔ (since the "select" and the "from" clauses are correct, while the "where" clause is incorrect), but the first pairing is more similar than the second pair. TED provides more granular distinctions, even for partial matches.

Various metrics can be used to evaluate the performance of the machine learning trained transformer 200. By way of non-limiting example, two of the most commonly used evaluation metrics for SQL comparison are exact match and execution match. Exact match checks if two SQL statements are syntactically equivalent, while execution match checks if running two SQL statements yields the same output. Since exact match is binary, its value might not be very informative for the user nor the model. Partial matches sub-divide the comparison to only portions of the SQL statement, such as the from clause or the where clause. Thus, one SQL prediction might be wrong in multiple parts of the query, and this more granular information can be useful to improve the model.

The performance of the ranker may be evaluated using TED, as further described with respect to FIG. 3.

FIG. 3 is a flow diagram illustrating an embodiment of a process for determining a tree edit distance. This process may be implemented to evaluate the performance of the machine learning trained converter 200 including the generator 210 and the ranker 230. A tree edit distance (TED) between two trees refers to the minimum amount of edits to transform one tree into another. An edit can be a node addition, removal, or rename and indicates the degree of difference between two trees. In order to compute the TED between two computer language (e.g., SQL) statements, a tree is formed for each statement and the TED is computed between the two trees (e.g., using APTED3) as follows.

The process begins by determining a first abstract syntax tree (AST) for a computer language statement generated by the machine learning trained ranker (300). For example, a SQL query generated by ranker 230 can be converted to an AST using Lark.

The process determines a second abstract syntax tree for a ground truth computer language statement (302). Similar to 300, the ground truth SQL query can be converted to an AST using Lark. The ground truth SQL query refers to the correct SQL query associated with a natural language input.

The process calculates a tree edit distance between the first AST and the second AST (304). In various embodiments, when the AST is determined at 300 and 302, semantic equivalence checks and calibrations are performed so that if two queries are equivalent given their aliases, the TED would be 0. In various embodiments, due to SQL's semantics, the SQL is normalized to a canonical representation (e.g., sort the list of tables in the select alphabetically, transform left joins into right joins) and modify APTED in order to guarantee that the TED is meaningful (e.g., the cost of removing a terminal and column name should be the same).

The process determines a tree edit distance score based on the calculated tree edit distance (306). In various embodiments, a TED score of 0 indicates that the trees are identical, while scores greater than 0 indicate that there are differences between the trees and the larger the score, the bigger the difference. Although not shown, a mapping between the trees can be performed to generate figures representing the trees.

The process determines model performance based on the determined tree edit distance score (308). For example, a machine learning trained converter may be considered to perform well if the average TED score is below a threshold (e.g., set by a user), indicating that the computer language prediction is close to the ground truth computer language statement.

FIG. 4 is a block diagram illustrating an embodiment of a system for providing constrained decoding and ranking of language models for code generation. The system 400 includes a program development tool 401 (e.g., including a programmatic logic flow builder also sometimes called a "visual modeling environment"), a machine learning trained converter 413, a data model (schema) database 416, a repository 403, an application generator 406, an application server 408, and database 410.

Software architect(s)/developer(s) 405, including a user who is designated with the task of designing computer software design models, uses a program development tool 401 (e.g., programmatic logic flow builder, integrated development environment (IDE), visual modeling environment, Service Studio by OutSystems®, etc.) to edit, generate and modify program code components (e.g., including programmatic logic flow(s), backend code, frontend code, user interface layout(s), styling(s), configuration(s), data model(s), etc.) using a graphical user interface. In some embodiments, program development tool 401 facilitates the visual construction and modification of the program code components in a user friendly and intuitive way. For example, the program development tool 401 may allow a user to visually select elements of a programmatic logic flow, and connect them as desired. Software architect(s)/developer(s) 405 may provide a natural language input within a GUI of the program development tool 401, and the disclosed techniques may be applied to transform the natural language input to a computer language output. The program development tool 401 can be a software program running on a developer's 405 device, or can be software running on a server (e.g., accessed via a browser), or some combination. In one implementation, the program development tool 401 is a combination of a software program running on a developer's computer and a set of software services running on a server being accessed by the modeling environment. Some example GUIs associated with the program development tool are shown in FIGS. 5-13B.

Program code components 402 may include a programmatic logic flow description that describes, using abstractions, the intended behavior of a computer software system. Program code components 402 may also include backend code, frontend code, user interface layout(s), styling(s), configuration(s), data model(s), etc. Examples of functionality provided by such computer software systems include: login verification, notification, database storage, order processing, electronic wallet, calendar/scheduler, directories, news and information, and so on. Using the program development tool 401, it is possible for a developer 405 to model distinct aspects of a computer software system, such as (a) the user navigation and user interface content to be presented to end-users; (b) the business rules that apply to the execution of the interactive events triggered by the end-user; (c) and the data transmission and data repository formats and relationships that support the execution of the application. These distinct aspects, in some implementations, can describe the intended behavior of the computer software system.

The design process of the program code component 402 (e.g., programmatic logic flow, frontend code, backend code, user interface layout(s), styling(s), configuration(s), data model(s), etc.) can be assisted by the disclosed techniques. For example, machine learning trained converter 200 is configured to generate a computer language output by performing a process such as the one further described with respect to FIG. 1. Machine learning trained converter 413 can receive natural language input via program development tool 401 and use a data model schema from store 416 as further described herein.

Designed program code components 402 (e.g., programmatic logic flow(s), frontend code, backend code, user interface layout(s), styling(s), configuration(s), data model(s), etc.) are submitted for storage in repository 403. For example, once a programmatic logic flow is designed, it is compiled into a programmatic logic flow description included in program code components 402 to be submitted to repository 403. The visual representations of the programmatic logic flows in the program development tool 401 are translated into a structured representation used for processing by other components of the system 400. In some embodiments, the program development tool 401 is responsible for creating a programmatic logic flow description document from visual representations. The programmatic logic flow description can be generated at various times, for example when a developer 405 triggers the submission of a programmatic logic flow to the programmatic logic flow version repository 403 or in response to developer interaction with the programmatic logic flow such as adding, removing, or modifying a step in the programmatic logic flow.

In one embodiment, the programmatic logic flow description document included in program code components 402 is structured using XML (Extensible Markup Language) or OML (Outline Markup Language). XML is a language that can be used to describe information, or to make information self-describing, and which can facilitate mapping of visual models into a structured representation that can be parsed by other components of the system 400. OML is a bundle of XMLs with file compression. The programmatic logic flow description document is an encoding (e.g., in XML) of a metamodel/graph of the visual code.

The repository 403 stores the program code components 402. By storing versions as development progresses, the repository retains information about how and when a program code component (e.g., a programmatic logic flow) changed over time. At any point in time, an authorized developer 405 can add a new version of a program code component to the programmatic logic flow repository 403. Additionally, the version repository 403 is integrated with the program development tool 401 to support collaboration among concurrent developers 405. In the simplest case, one single developer 405 adds revised versions of a program code component to the programmatic logic flow repository 403. In more complex implementations, multiple developers 405 retrieve and add distinct versions of a program code component to and from the repository 403. After completing a first version of a program code component, the program code component can continue to be developed, and, by learning with new developments, the model can self-evolve and optimize.

The repository 403 may be based on a database server such as Microsoft® SQL Server, Amazon® AWS Database, Oracle® Database, Postgres® and accessed via software services hosted in an application server system. These software services provide to the program development tool 401 means to submit and retrieve programmatic logic flows as well as to submit and retrieve information about repository 403 content.

In the context of system 400, an application generator 406 may be used to translate program code components into an implementation of a computer software system. An implemented computer software system may include an executable program 409 to run in an application server 408 and a database definition to be hosted in a relational database system 410. The user navigation and user interface aspects, as well as the business rule and data transmission aspects of the model, are translated into the executable program 409. The executable program can be any executable or interpreted program, for example a web application targeting the .NET® platform from Microsoft®, Java/Jakarta Enterprise Edition (JEE) platform available from Oracle®, or various PHP-based platforms.

The data repository aspects of the computer software system are translated into a database 410. The database can be any sort of relational database. The generated executable program 409 may be automatically configured to access the database 410 according to the designed program code component (e.g., including the programmatic logic flow).

Once the executable program 409 and the database 410 are available on the system 400, respectively in the target application server system 408 and the relational database system 410, the application server system 408 can handle requests from end users 407, for example, using a Hyper Text Transfer Protocol (HTTP) client 412, a mobile client, a Web Browser, a backend system, etc. This means that the elements in the model that denote the way end users see and interact with the computer software system are generated as code, for example Web pages that are hosted in an application server system 408 and served via HTTP to a client 412. A request generates a response that is sent back to client system 412, which then may take the form of a graphical user interface to be displayed to end user 407. Some controls embedded in the graphical user interface may react to subsequent user generated events, and cause the browser to generate subsequent requests back to the application server system 408. For example, when a user presses a button visible in the client system 412, a form may be submitted to the application server system 408 that in response provides the content of a new interactive form to the client system 412.

The following figures show some examples of a graphical user interface for using natural language to query data based on constrained decoding and ranking of language models for code generation. In the examples, natural language queries or statements can be transformed to a computer language statement for computer execution using the disclosed techniques. As further described herein, suggestions such as autocompletion can be provided to the user in real time to help form a natural language statement that is more easily/efficiently transformed into a computer language statement.

The GUI may include one or more of the following:

Autocompletion (e.g., of sentences) based on suggestions, using a model trained on the Aggregates/Query descriptions and documentation. This may help users write better (e.g., easier to convert to computer language) natural language prompts more quickly.

Autogenerate and suggest documentation for the Aggregates/queries.

Guide users writing the natural language prompt by suggesting table names and attributes, improving the input to the model. Help the user validate whether the resulting query is what the user expects from their prompt using the model confidence and the analysis of the result and the prompt.

Integrating the natural language prompts across the user experience (user interfaces), to describe what data users want in the user interface directly.

Figure 5:
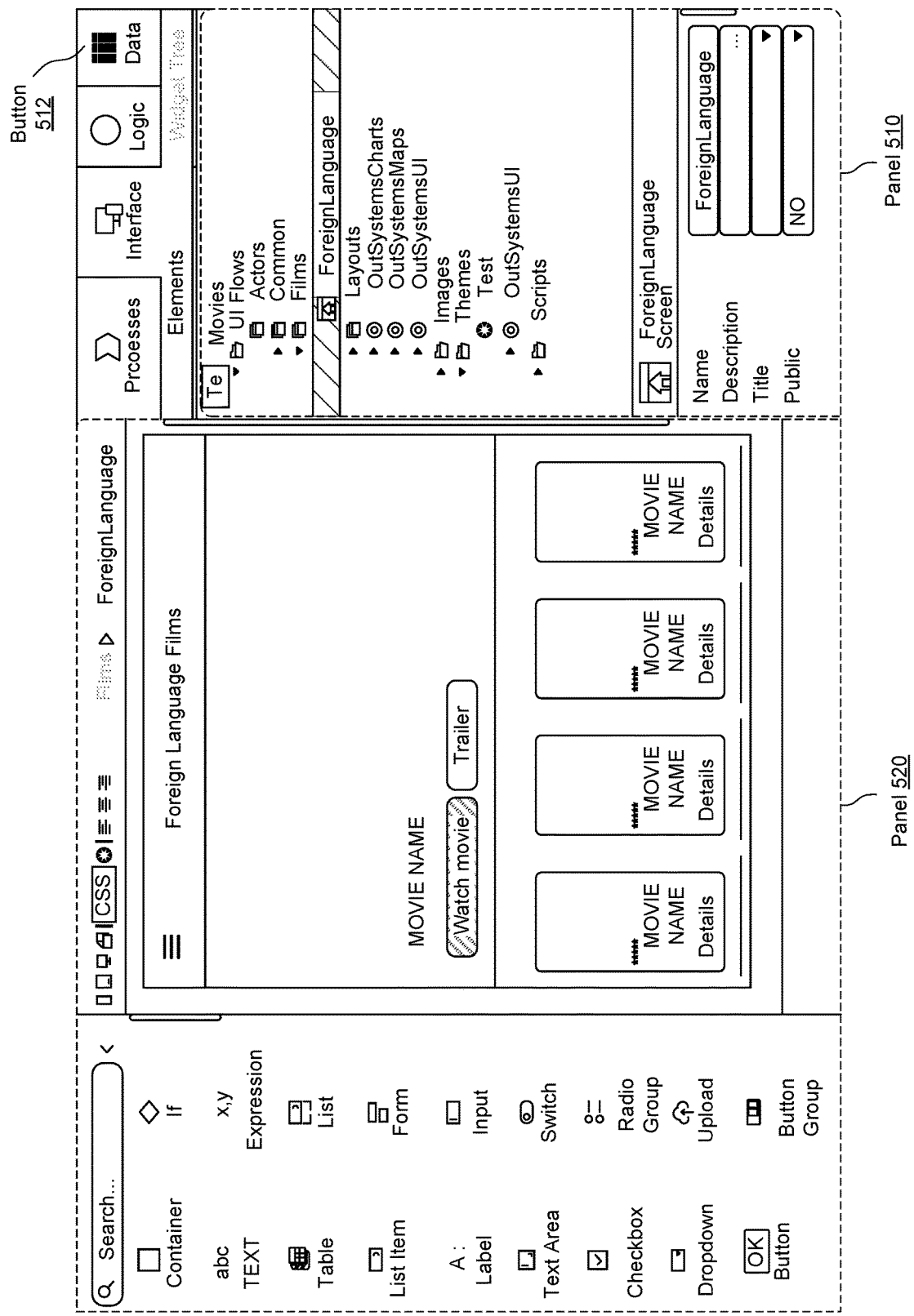
FIG. 5 illustrates an example of a graphical user interface obtained in some embodiments.

FIG. 5 illustrates an example of a graphical user interface obtained in some embodiments. In various embodiments, this graphical user interface is an example of Service Studio by OutSystems®. The graphical user interface (GUI) provides guidance to a user to help the user write a better natural language statement and pick a desired result/functionality. In this example, an end user is using the GUI to design a webpage about foreign language films. In this example, panel 520 displays various aspects of the interface. Panel 510 shows a navigation menu where the user can switch between different pages/screens of the web site that is being designed. Selecting button 512 causes panel 510 to be updated to show data associated with the interface, an example of which is shown in the next figure.

Figure 6:
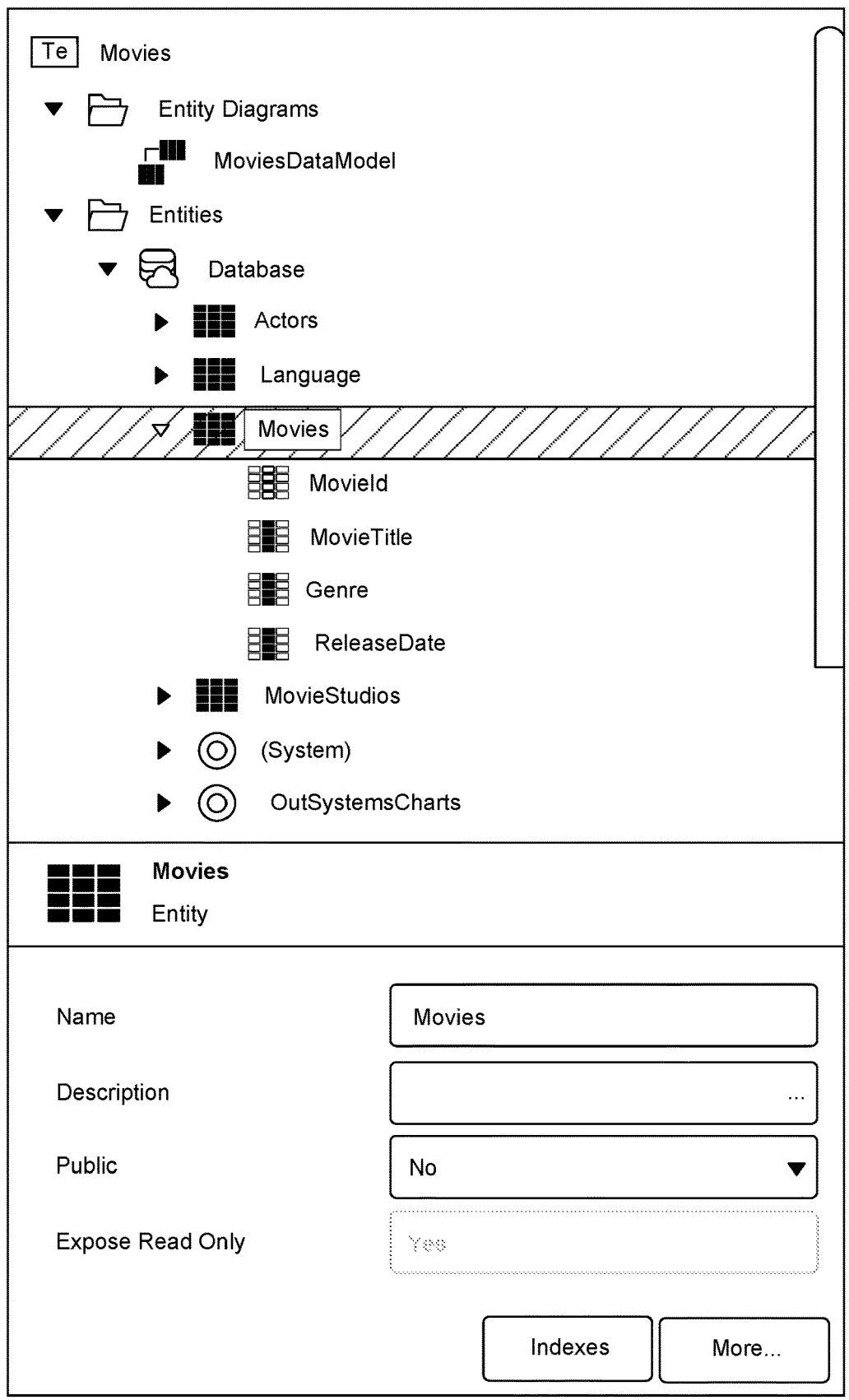
FIG. 6 illustrates an example of a graphical user interface obtained in some embodiments.

FIG. 6 illustrates an example of a graphical user interface obtained in some embodiments. This GUI is an example of panel 510 of FIG. 5, and helps visualize the data associated with (e.g., that can be used to populate) the GUI of FIG. 6. In this example, the database contains the following database entities (e.g., tables): Actors, Language, Movies, and Movie Studios. For an entity such as Movies table, there may be fields such as MovieID, MovieTitle, Genre, and ReleaseDate.

Figure 7:
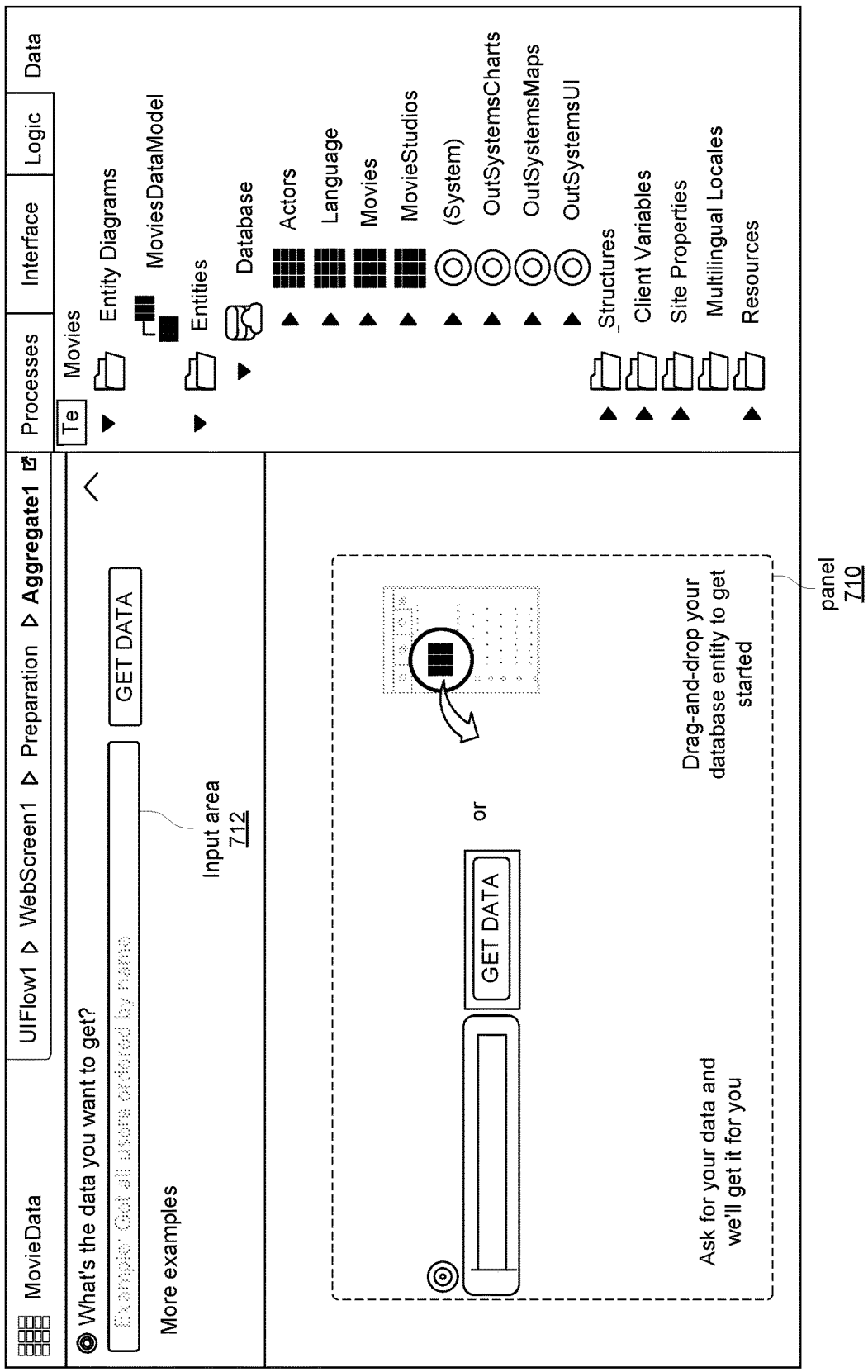
FIG. 7 illustrates an example of a graphical user interface for entering a natural language statement to interact with data obtained in some embodiments.

FIG. 7 illustrates an example of a graphical user interface for entering a natural language statement to interact with data obtained in some embodiments. Panel 710 shows instructions for interacting with data. For example, the user can ask for data (e.g., entering a natural language statement into input area 712) and the system will get the data for the user. Alternatively, the user can drag and drop a database entity into the panel 710. The input area 712 accepts any combination of characters (e.g., letters, numbers, symbols, etc.). As further described herein, autocomplete or suggestions may be provided in real-time while a user is entering the natural language statement. Prior to receiving input, input area 712 may display an example ("Get all users ordered by name") as shown here. More natural language statement examples may be displayed by selecting "More examples" next to the input area 712. After the natural language statement is complete, a user may select the "Get Data" button to retrieve data associated with the natural language statement. In various embodiments, the disclosed techniques (e.g., the process of FIG. 1) may be performed to convert the natural language statement to a computer language statement and executed to retrieve the data.

Autocomplete helps form a structured natural language query that may be easier to process by providing a cleaner input to the generator (210) that maximizes the probability that a desired SQL statement will be generated. For example, autocomplete may correct typos or suggest alternatives such as spelling of certain entities, tables, variables, attributes, etc. However, the user may ignore the autocomplete suggestions and form any type of natural language statement. Even if the autocomplete is not used or the user otherwise mistypes a natural language statement, referencing (for example) an entity that does not exist, the backend can try to identify or infer the intended entity.

FIG. 8 illustrates an example of a graphical user interface for displaying information and instructions for entering a natural language statement obtained in some embodiments. This GUI is an example of content that can be displayed in panel 710 of FIG. 7. This content may provide instructions, examples, tutorials, or the like to help a user understand how to form and input a natural language statement.

On the left side of panel 800, instructions to ask the AI Assistant for data using natural language are displayed. Examples are displayed to show the data that would be fetched (we deliver) in response to a user's natural language statement (you ask). Two examples are shown, but this is merely exemplary and not intended to be limiting as a different number of examples of different types may be shown. The examples may be dynamically generated/displayed based on relevant data entities associated with a particular workspace, project, or user.

On the right side of panel 800, instructions to use suggestions are displayed. The information provides further guidance to a user to help the user enter a natural language statement in as best form as possible for converting to a computer language statement. Improving the natural language statement will increase the efficiency of forming a computer language statement that is more likely to obtain results (data) desired by the user when executed. For example, valid entities to be searched or spelling corrections may be suggested so that a query searches a table or database that exists.

Figure 9:
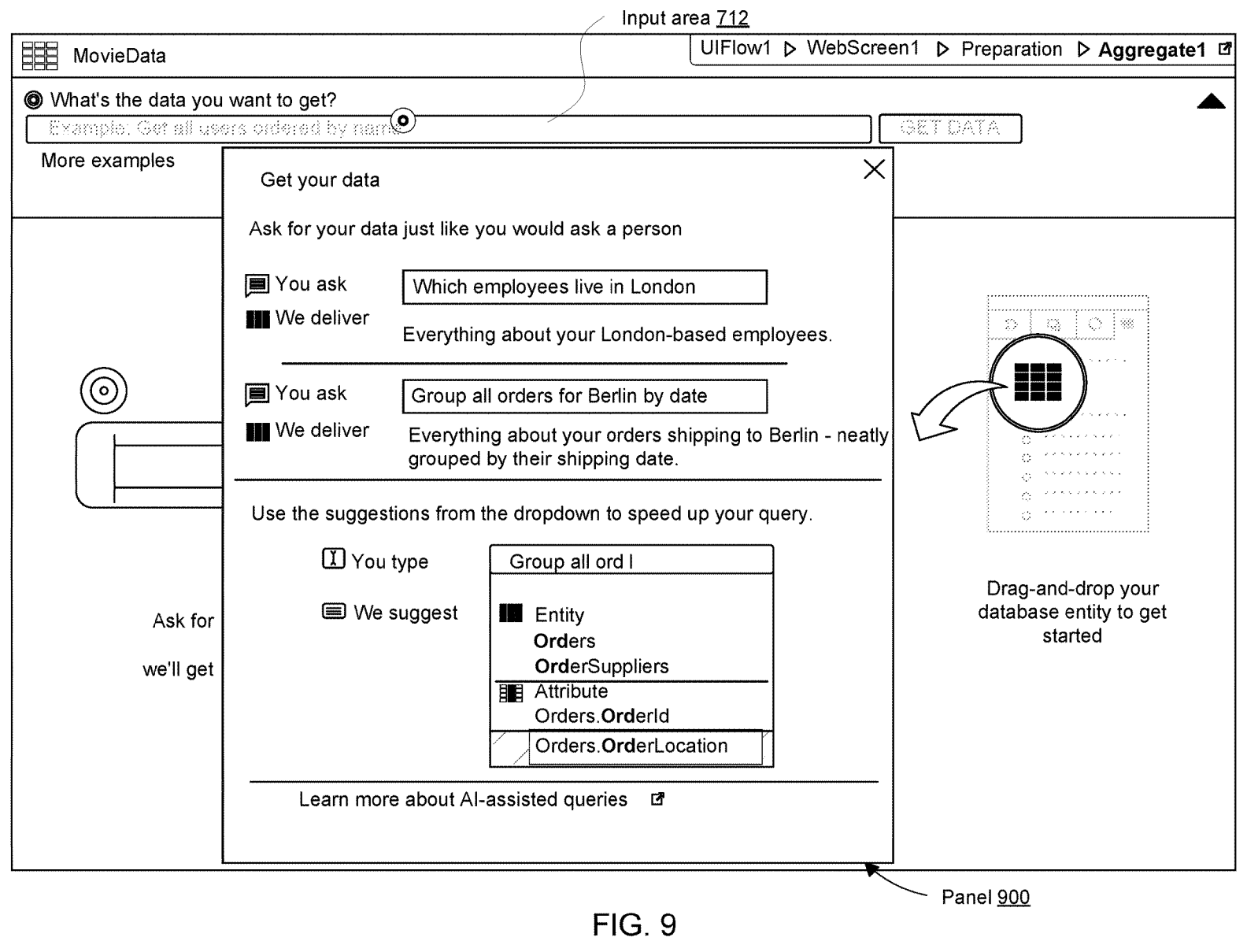

FIG. 9 illustrates an example of a graphical user interface including a pop-up for displaying information and instructions for entering a natural language statement obtained in some embodiments. Each of the components are like their counterparts in FIGS. 7 and 8 unless otherwise described herein. The pop-up panel 900 can be displayed in the GUI to provide instructions and examples of how to enter a natural language statement in area 712.

Figure 10:
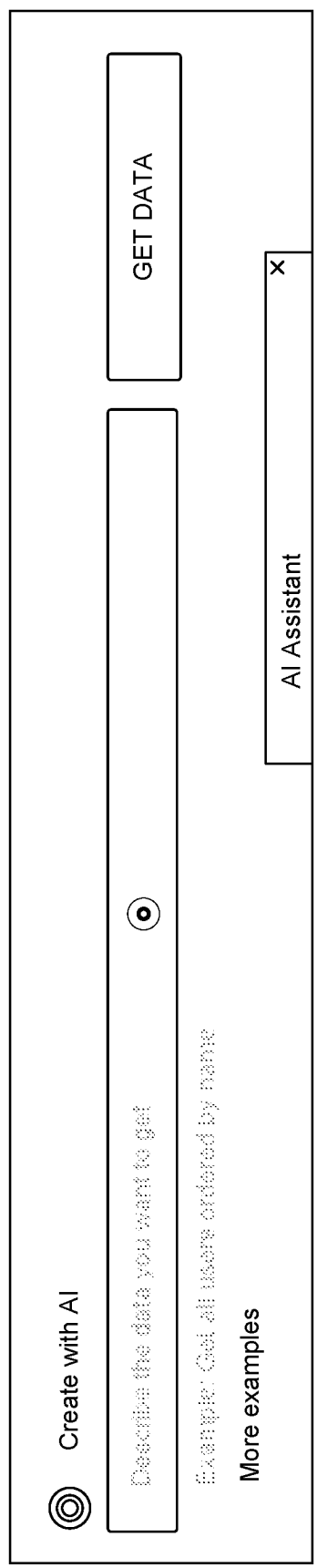
FIG. 10 illustrates an example of a graphical user interface including a natural language input area obtained in some embodiments.

FIG. 10 illustrates an example of a graphical user interface including a natural language input area obtained in some embodiments. The natural language input area shown here is another example of what can be displayed in the input area 712 of FIG. 9.

Figure 11A:
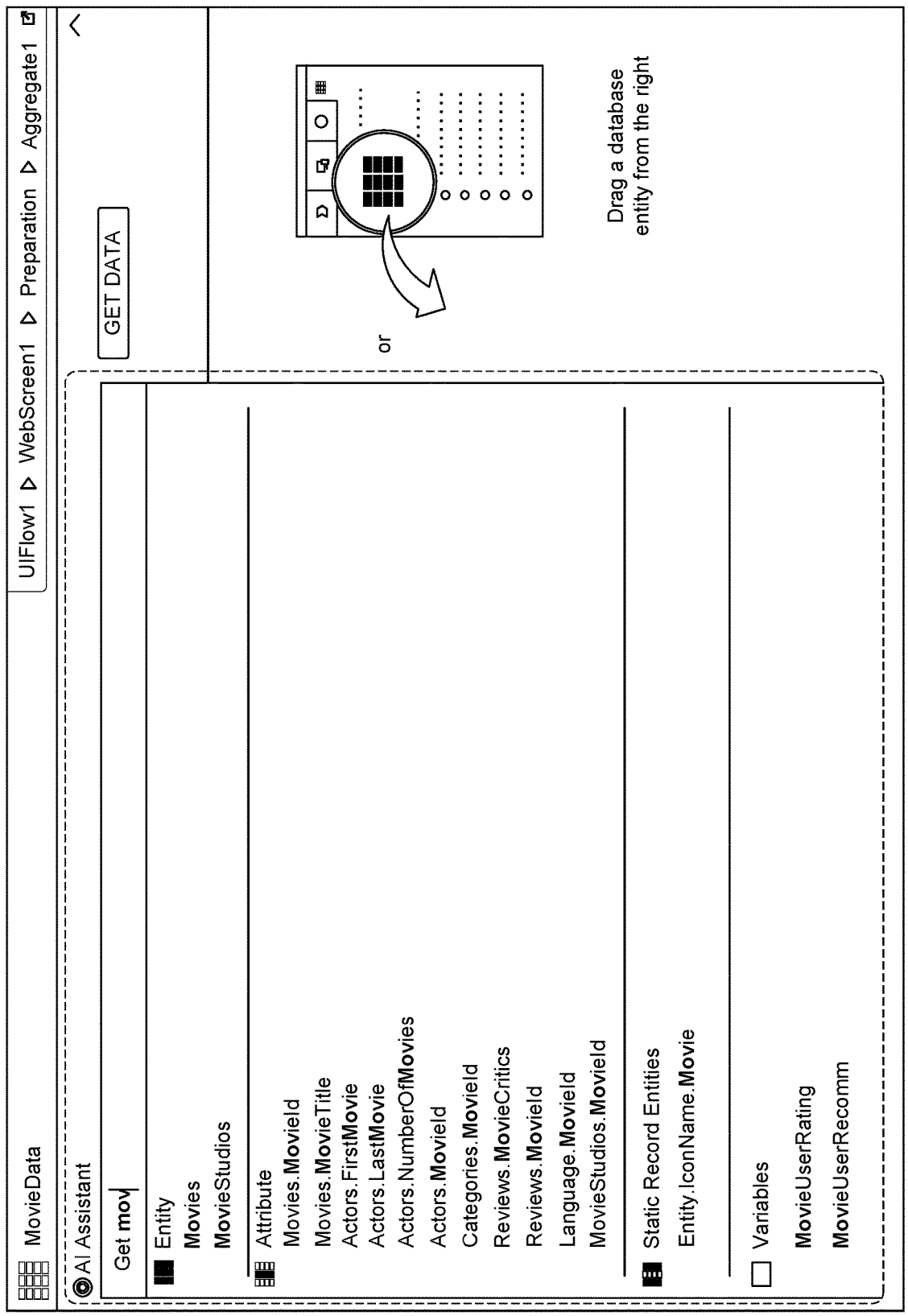
FIG. 11A illustrates an example of a graphical user interface including a drop-down obtained in some embodiments.

FIG. 11A illustrates an example of a graphical user interface including a drop-down obtained in some embodiments. The drop-down includes information to assist the user with forming a natural language input. For example, the information guides the user by providing Entity, Attribute, and Variable suggestions. The information may increase prediction accuracy by having the user's choices provide classification to the model.

Figure 11B:
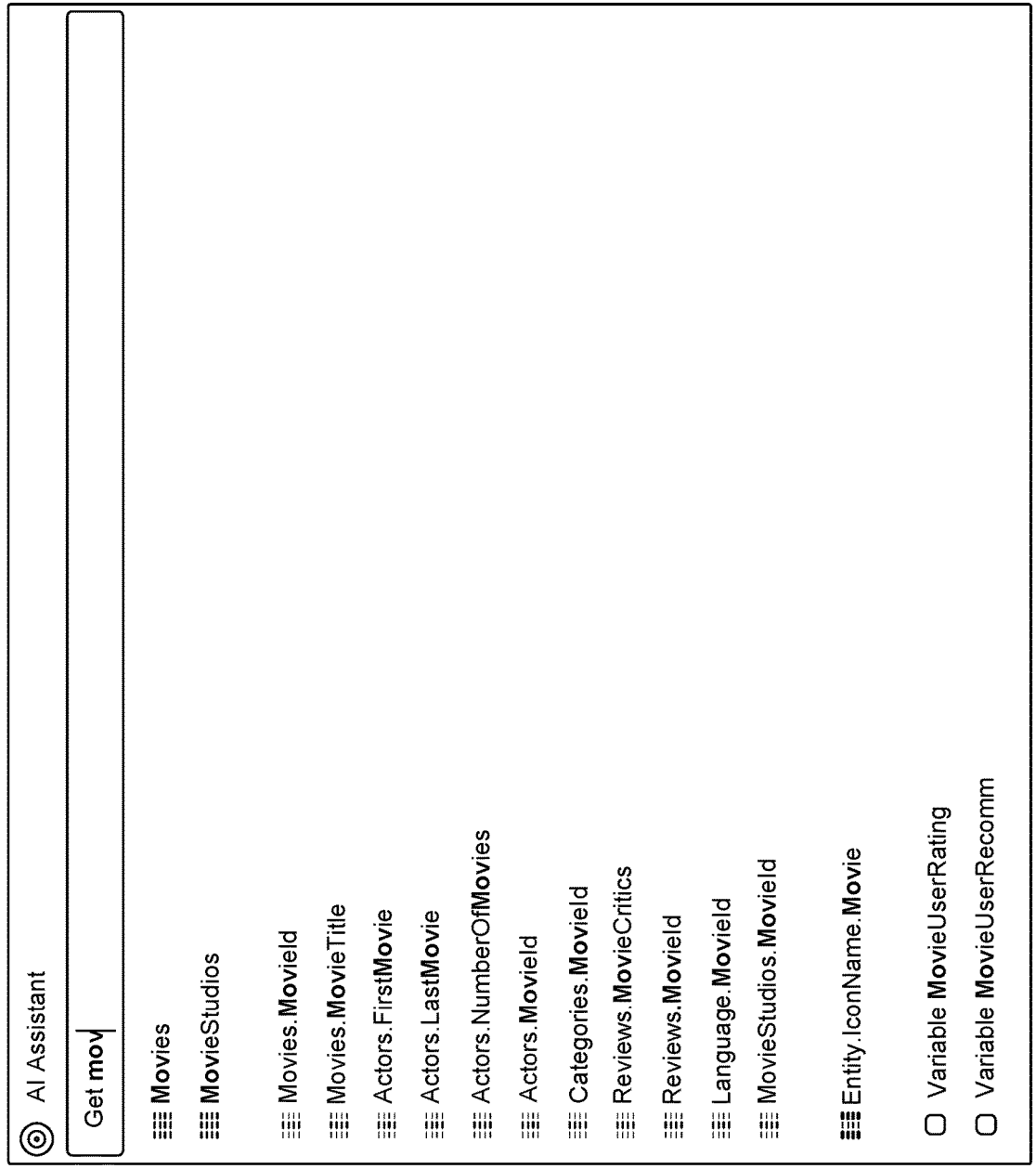
FIG. 11B illustrates another example of a graphical user interface including a drop-down obtained in some embodiments.
Figure 11C:
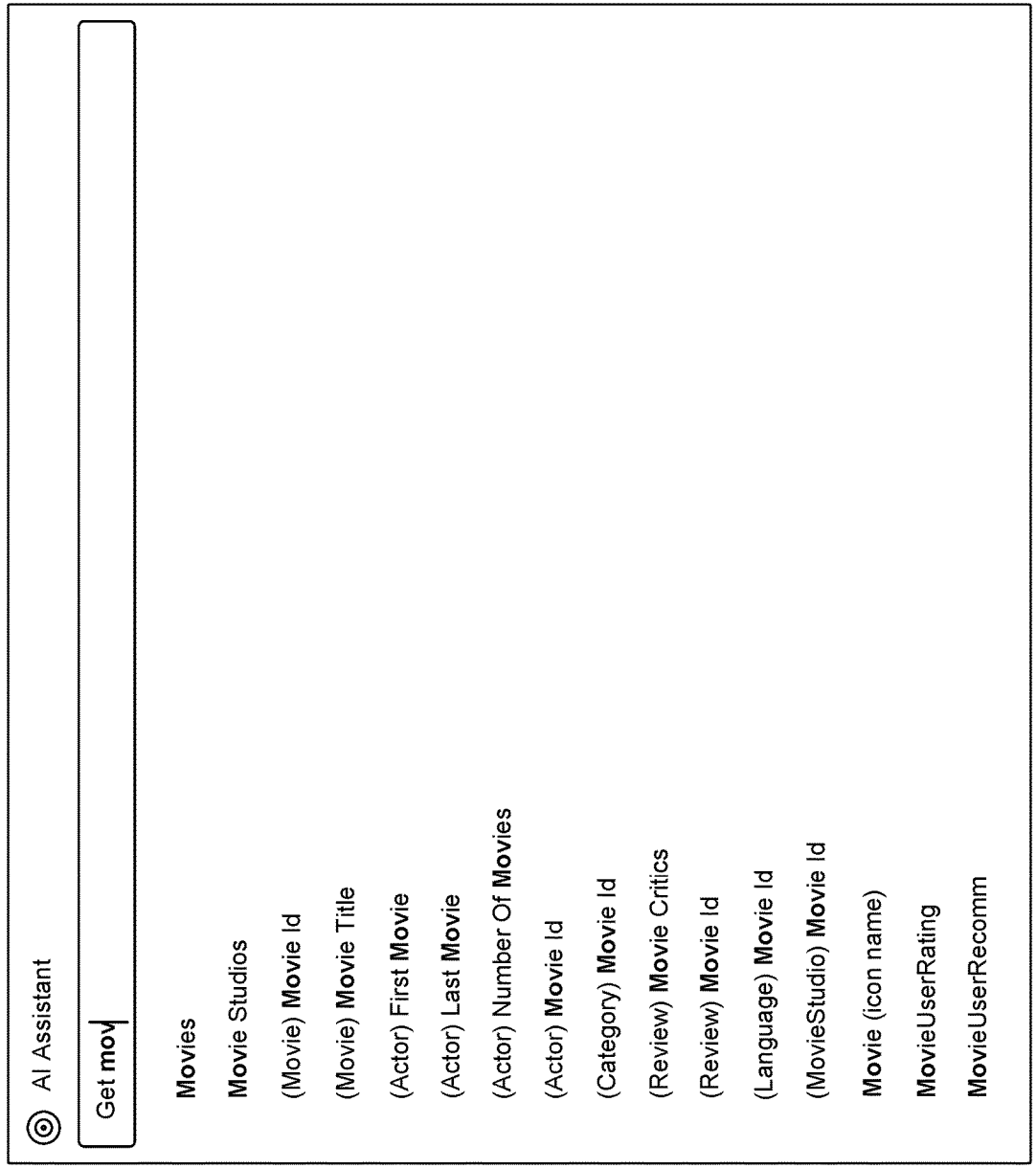
FIG. 11C illustrates another example of a graphical user interface including a drop-down obtained in some embodiments.
Figure 11D:
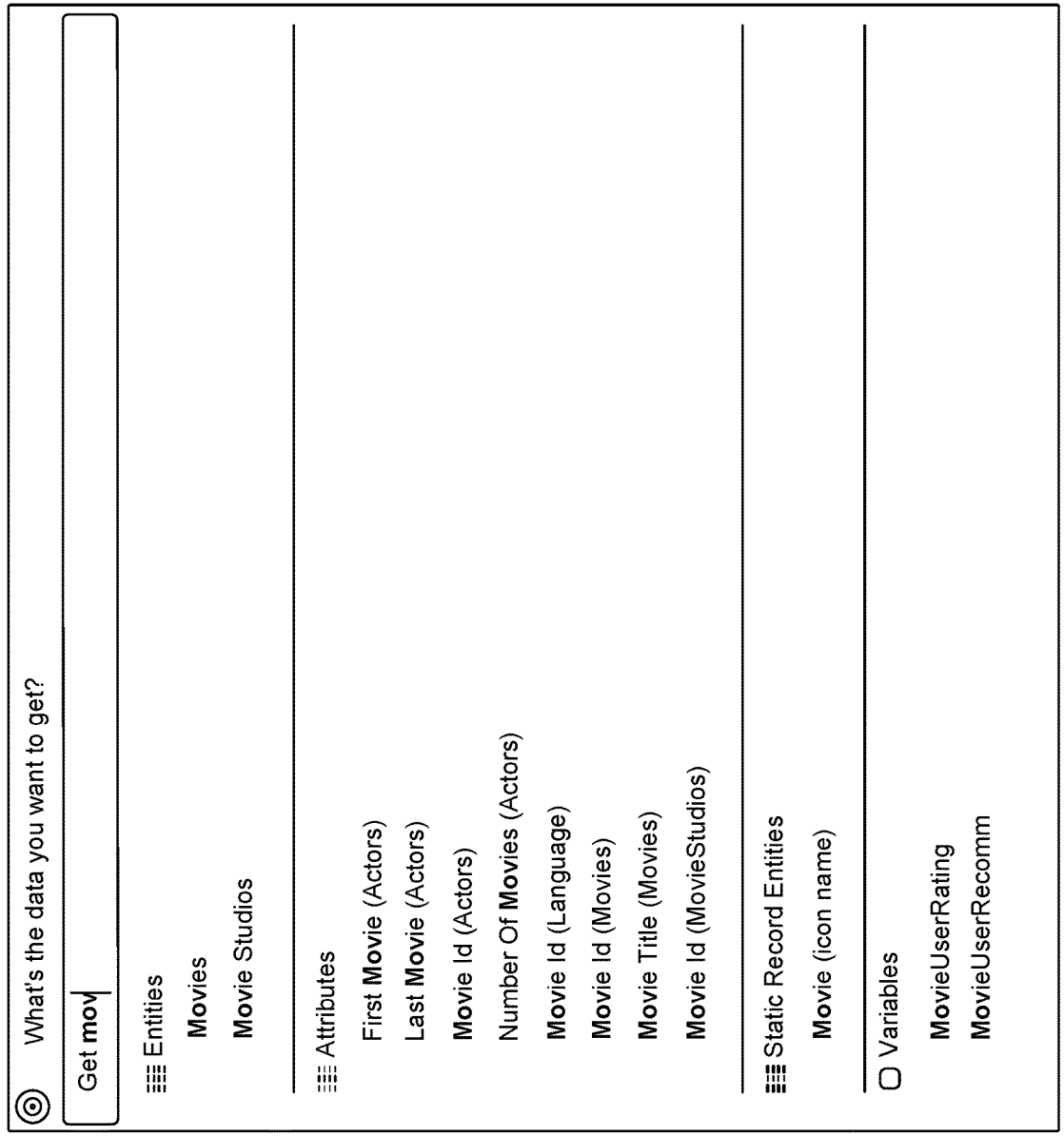
FIG. 11D illustrates another example of a graphical user interface including a drop-down obtained in some embodiments.
Figure 11E:
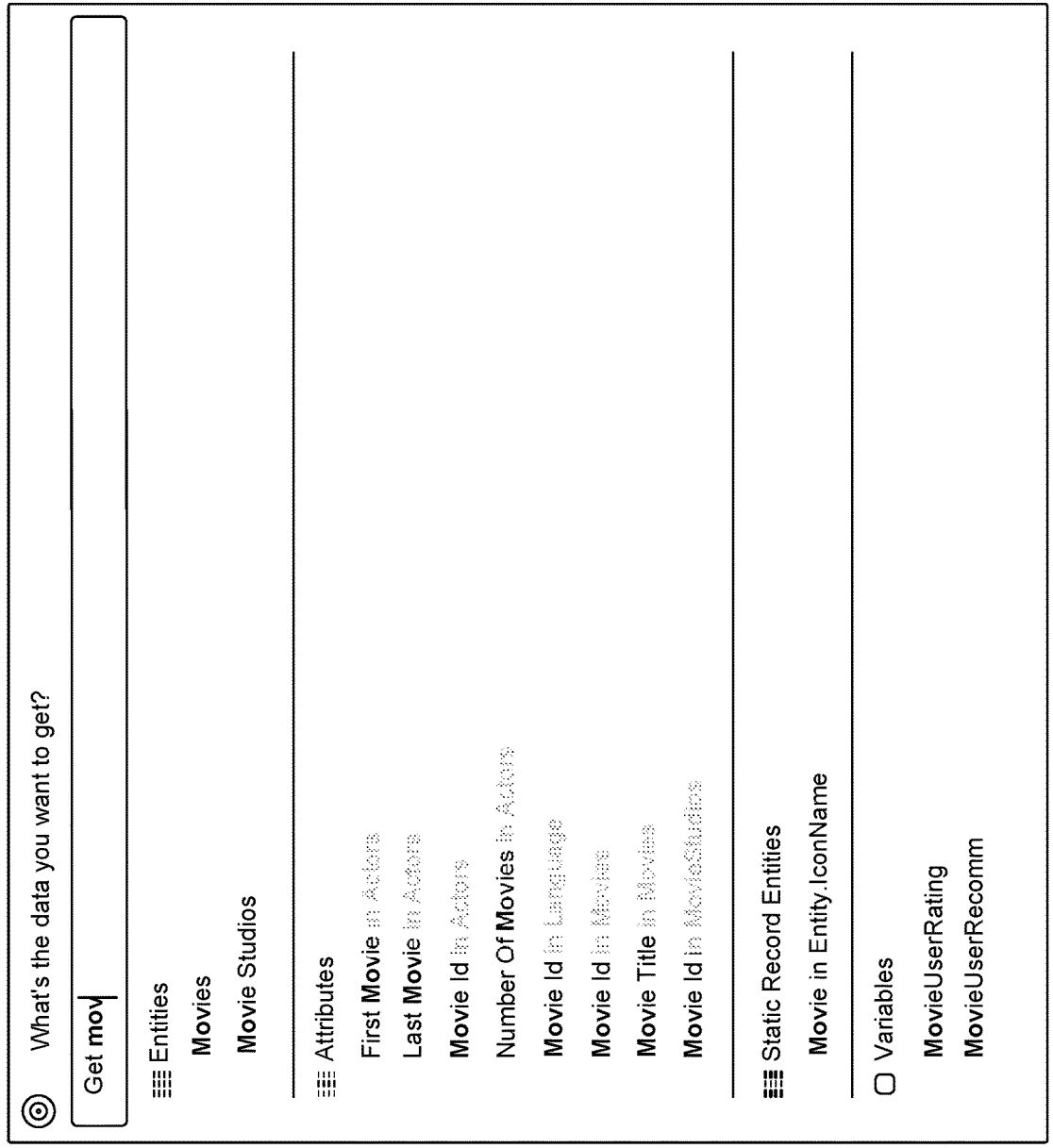
FIG. 11E illustrates another example of a graphical user interface including a drop-down obtained in some embodiments.

FIG. 11B illustrates another example of a graphical user interface including a drop-down obtained in some embodiments. FIG. 11C illustrates another example of a graphical user interface including a drop-down obtained in some embodiments. FIG. 11D illustrates another example of a graphical user interface including a drop-down obtained in some embodiments. FIG. 11E illustrates another example of a graphical user interface including a drop-down obtained in some embodiments. As shown in FIGS. 11A-11E, suggestion types are easily distinguishable by the user (name, icon, category). Inserted text does not break the natural language flow ("Last Movie (Actors)" vs. "Actors.LastMovie"). The drop-down can automatically open at key moments, but not block the user from writing. The drop-down enables the system to collect information about the user choices to send to the machine learning trained converter.

Figure 12:
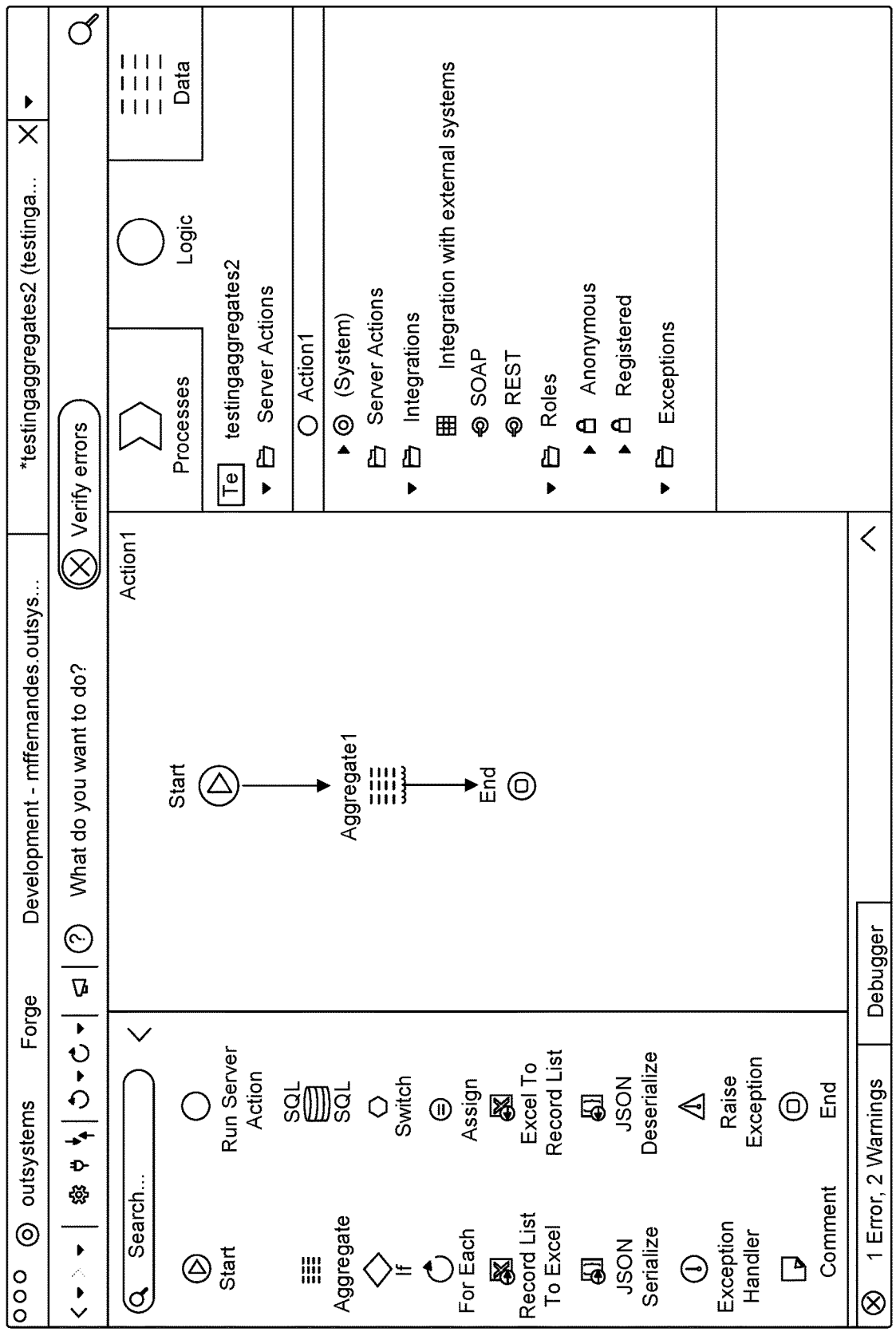
FIG. 12 illustrates an example of a graphical user interface in a low-code platform obtained in some embodiments.

FIG. 12 illustrates an example of a graphical user interface in a low-code platform obtained in some embodiments. This user interface is similar to the other ones described herein. The process of FIG. 1 can be applied to transform a natural language input (response to "What do you want to do?") to a computer language output. For example, the user can work with Aggregate1 as follows.

Figure 13A:
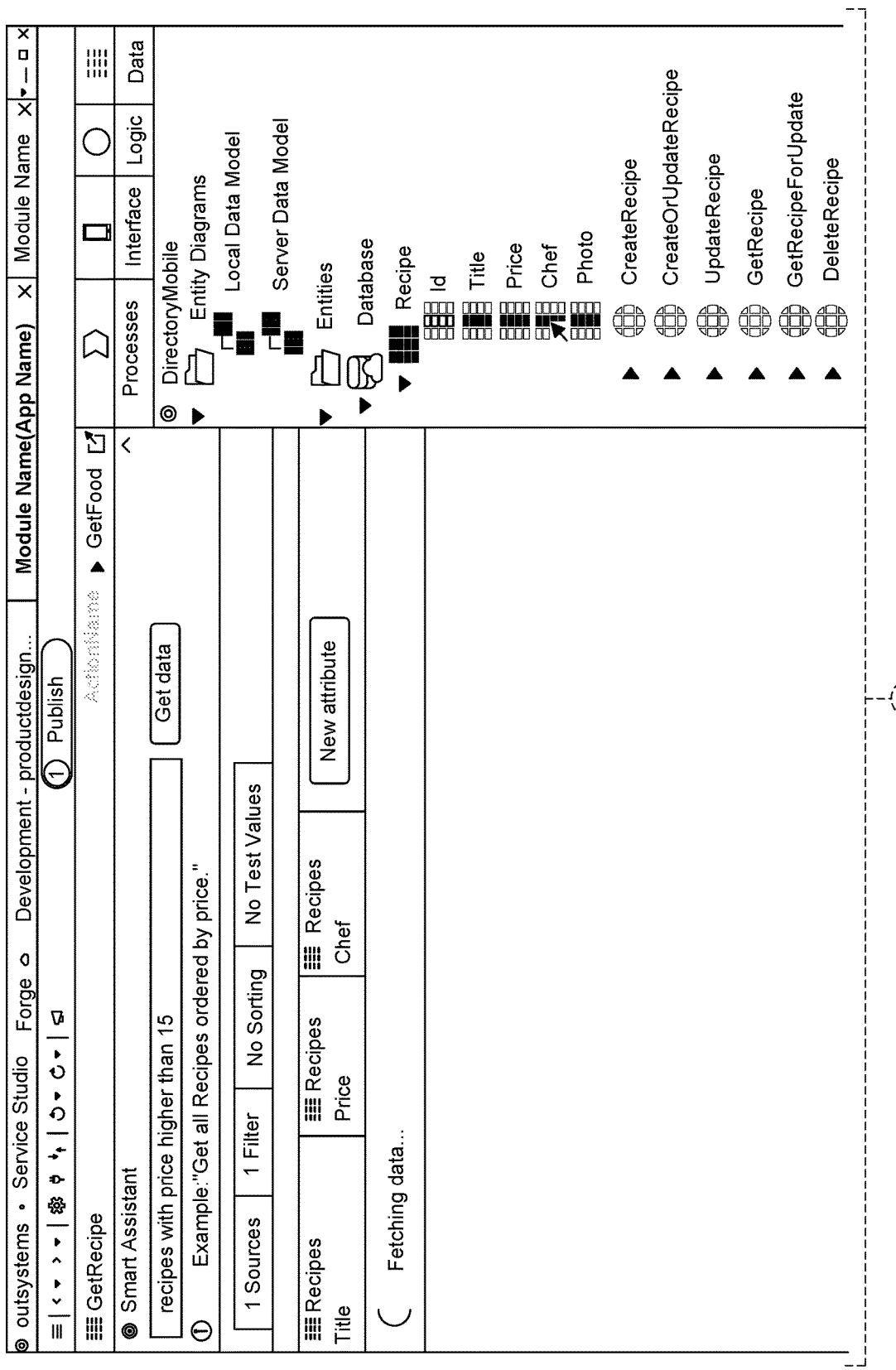
FIG. 13A illustrates an example of a graphical user interface for inputting a natural language statement obtained in some embodiments.
Figure 13A:
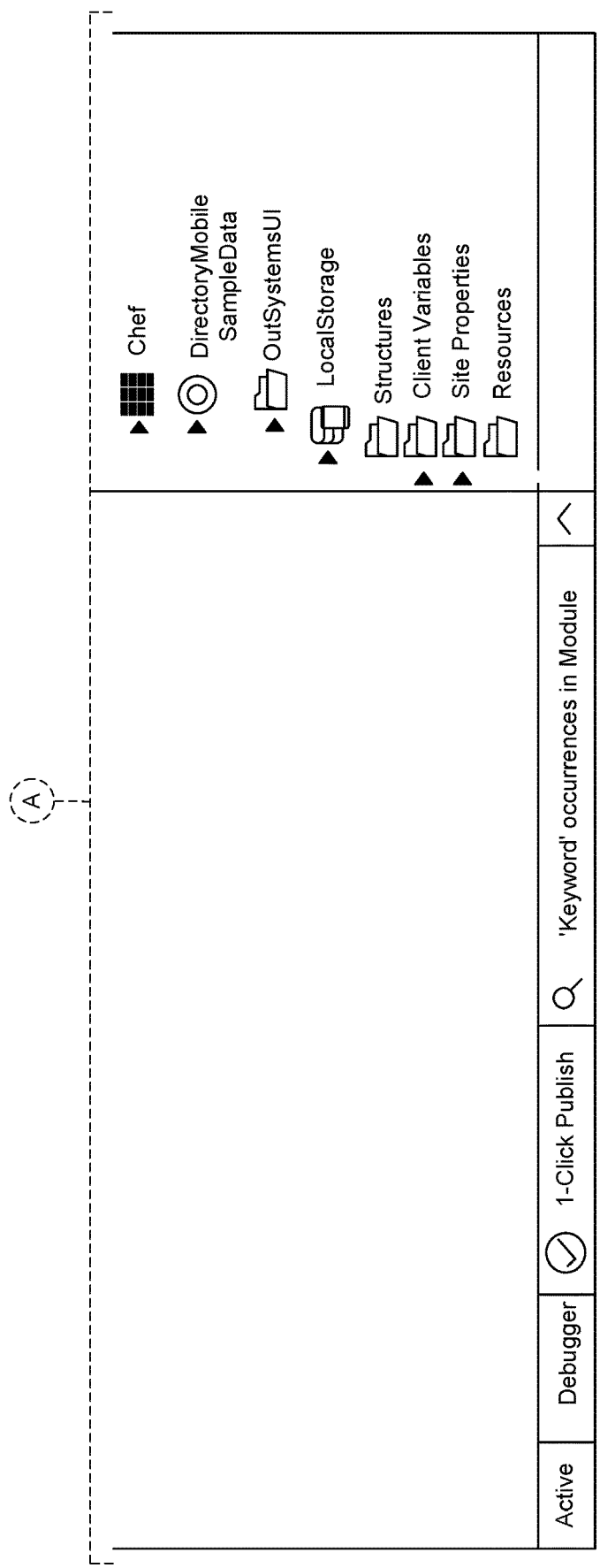

FIG. 13A illustrates an example of a graphical user interface for inputting a natural language statement obtained in some embodiments. A natural language input can be collected in the box next to the "Get Data" button. The natural language input can be transformed to a computer language output using the process of FIG. 1.

Figure 13B:
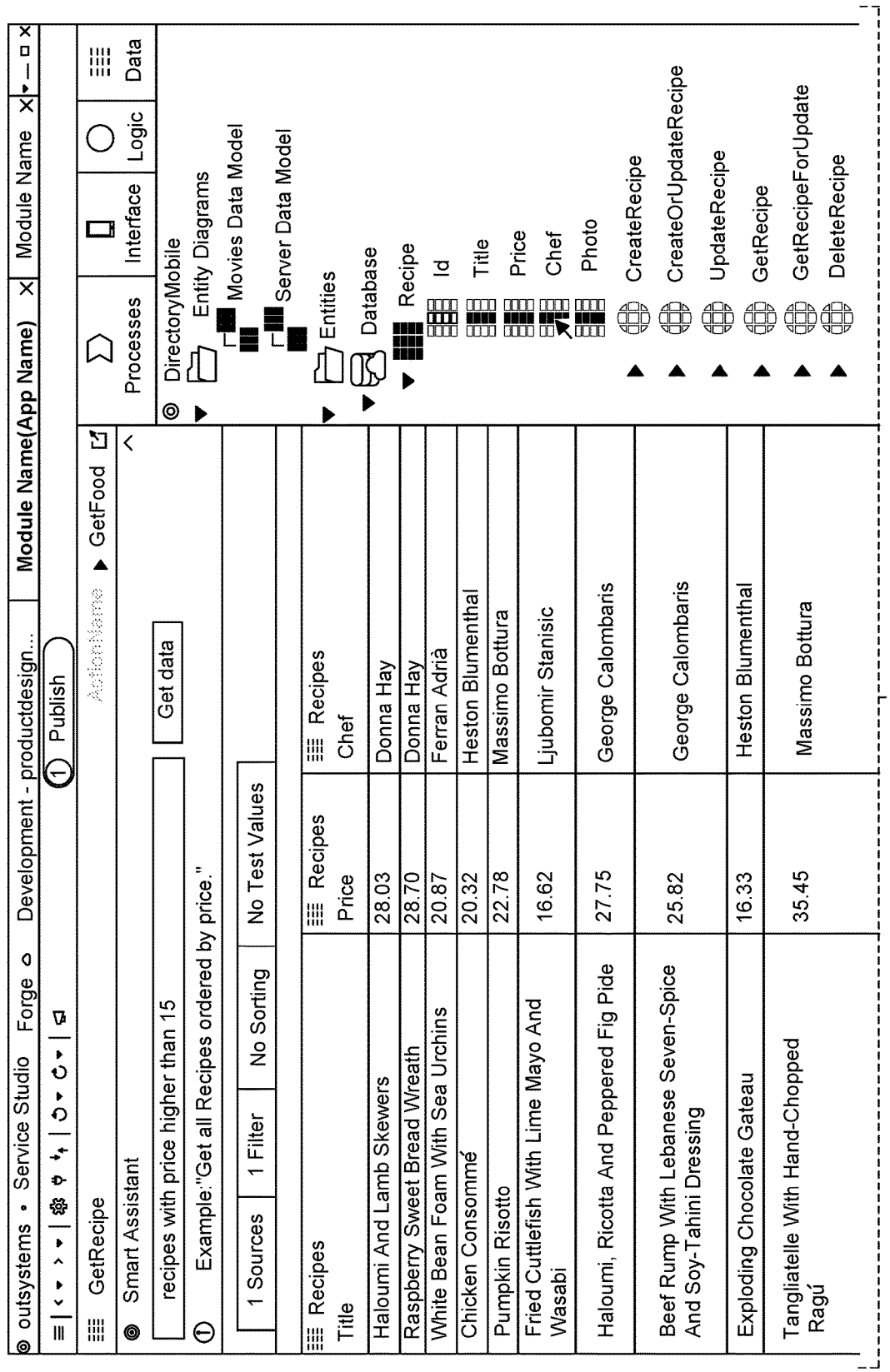
FIG. 13B illustrates an example of a graphical user interface for outputting results of executing a computer language statement corresponding to a natural language statement obtained in some embodiments.

FIG. 13B illustrates an example of a graphical user interface for outputting results of executing a computer language statement corresponding to a natural language statement obtained in some embodiments. In response to transforming the natural language input from FIG. 13A, relevant data is obtained and displayed as shown.

Advantages of the disclosed techniques include reduced code development time and more efficient use of available computing resources (or reduced use of computing resources). Database accesses are prevalent in programming projects and, thus, automating them is particularly helpful for inexperienced programmers, both as a learning tool (by examining the resulting computer language output) and a means to deliver higher quality software than they would by themselves. Currently available deep learning techniques require large language models to achieve good results on benchmark datasets, which reduces their applicability since most developers might not have access to a GPU or, when they do have access, this is expensive for the developer. Furthermore, state-of-the-art techniques do not guarantee that a valid answer will be found for all queries. The disclosed techniques achieve state-of-the-art performance in benchmark datasets using small language models. Experiments have been performed that show that using T5-Base, the disclosed techniques achieve ~75% exact match, and about the same performance as PICARD when using T5-3B.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  receiving a natural language input specifying a desired computer task;
  using a machine learning trained converter to convert the natural language input to an output in a computer language based at least on a machine learning trained ranker, including by, based on a specified grammar for the computer language, limiting eligible options for a token to include in the output in the computer language, wherein the machine learning trained ranker is evaluated including by:
    calculating a difference between a computer language statement generated by the machine learning trained ranker and a ground truth computer language statement;
    determining a score based on the calculated difference; and
    determining model performance based on the determined score; and
  providing the output in the computer language for computer execution.

2. The method of claim 1, wherein using the machine learning trained converter to convert the natural language input to the output in a computer language includes forming a candidate output in the computer language by:
  starting with a first token; and
  iteratively concatenating a token from the eligible options.

3. The method of claim 2, wherein using the machine learning trained converter to convert the natural language input to the output in a computer language includes:
  performing beam search to generate a set of computer language outputs including the candidate output.

4. The method of claim 3, wherein:
  the set of computer language outputs includes a ranked list of computer language outputs; and
  using the machine learning trained converter to convert the natural language input to the output in a computer language includes selecting at least one computer language output from the ranked list of computer language outputs using the machine learning trained ranker.

5. The method of claim 4, at least one computer language output is selected based at least on a ranker score determined by the machine learning trained ranker and a generator score associated with generating the set of candidate computer language outputs.

6. The method of claim 4, wherein performance of the machine learning trained ranker is evaluated including by:
determining a first abstract syntax tree for the computer language statement generated by the machine learning trained ranker; and
determining a second abstract syntax tree for the ground truth computer language statement; wherein:
the calculated difference includes a tree edit distance on the first abstract syntax tree and the second abstract syntax tree; and
the score based on the calculated difference includes a tree edit distance score based on the tree edit distance.

7. The method of claim 1, wherein the specified grammar is pre-defined.

8. The method of claim 1, wherein the specified grammar includes at least one rule specifying a valid table and valid columns permitted to be added to the table.

9. The method of claim 1, wherein using the machine learning trained converter to convert the natural language input to the output in a computer language includes ordering a "from" token to precede a "select" token.

10. The method of claim 1, wherein the natural language input is created using a low-code platform.

11. The method of claim 1, wherein the natural language input is created based at least in part on a suggestion or an auto-completion provided via a user interface.

12. The method of claim 11, wherein the user interface includes a drop-down menu displaying the suggestion or the auto-completion.

13. The method of claim 11, wherein the suggestion or the auto-completion is displayed in real-time in response to a user input of at least a portion of the natural language input.

14. The method of claim 11, wherein the suggestion or the auto-completion is determined based at least in part on valid entities to be searched.

15. The method of claim 1, wherein the natural language input is received via a user interface, and the user interface displays instructions for forming the natural language input.

16. The method of claim 1, wherein the output in the computer language is executable to perform the desired computer task.

17. The method of claim 1, wherein the computer task includes retrieving data from a relational database.

18. The method of claim 1, wherein the output in the computer language includes a Structured Query Language (SQL) statement.

19. A system, comprising:
a processor configured to:
receive a natural language input specifying a desired computer task;
use a machine learning trained converter to convert the natural language input to an output in a computer language based at least on a machine learning trained ranker, including by, based on a specified grammar for the computer language, limiting eligible options for a token to include in the output in the computer language, wherein the machine learning trained ranker is evaluated including by:
calculating a difference between a computer language statement generated by the machine learning trained ranker and a ground truth computer language statement;
determining a score based on the calculated difference; and
determining model performance based on the determined score score; and
provide the output in the computer language for computer execution; and
a memory coupled to the processor and configured to provide the processor with instructions.

20. A computer program product embodied in a non-transitory computer readable medium and comprising computer instructions for:
receiving a natural language input specifying a desired computer task;
using a machine learning trained converter to convert the natural language input to an output in a computer language based at least on a machine learning trained ranker, including by, based on a specified grammar for the computer language, limiting eligible options for a token to include in the output in the computer language, wherein the machine learning trained ranker is evaluated including by:
calculating a difference between a computer language statement generated by the machine learning trained ranker and a ground truth computer language statement;
determining a score based on the calculated difference; and
determining model performance based on the determined score; and
providing the output in the computer language for computer execution.

* * * * *